(12) United States Patent  
Zhang et al.

(10) Patent No.: US 12,395,290 B2  
(45) Date of Patent: Aug. 19, 2025

(54) TECHNIQUES FOR INDICATING A SYNCHRONIZATION SIGNAL BLOCK

(71) Applicant: QUALCOMM Incorporated, San Diego, CA (US)

(72) Inventors: Qian Zhang, Basking Ridge, NJ (US); Yan Zhou, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 754 days.

(21) Appl. No.: 17/532,567

(22) Filed: Nov. 22, 2021

(65) Prior Publication Data

US 2023/0163906 A1     May 25, 2023

(51) Int. Cl.
| | |
|---|---|
| *H04L 5/00* | (2006.01) |
| *H04W 24/08* | (2009.01) |
| *H04W 24/10* | (2009.01) |
| *H04W 56/00* | (2009.01) |
| *H04W 72/044* | (2023.01) |

(52) U.S. Cl.  
CPC ........... *H04L 5/0048* (2013.01); *H04W 24/08* (2013.01); *H04W 24/10* (2013.01); *H04W 56/001* (2013.01); *H04W 72/046* (2013.01)

(58) Field of Classification Search  
CPC ... H04W 24/08; H04W 24/10; H04W 56/001; H04W 72/046; H04L 5/0048; H04L 5/0057; H04L 5/0082; H04L 5/02  
See application file for complete search history.

(56) References Cited

U.S. PATENT DOCUMENTS

| | | | |
|---|---|---|---|
| 2014/0133336 A1* | 5/2014 | Park | H04B 7/0626 370/252 |
| 2022/0337376 A1* | 10/2022 | Zhao | H04L 1/1896 |
| 2024/0163808 A1* | 5/2024 | Agarwal | H04B 17/327 |
| 2024/0306100 A1* | 9/2024 | Noh | H04W 52/42 |

* cited by examiner

*Primary Examiner* — Michael Thier  
*Assistant Examiner* — Prince A Mensah  
(74) *Attorney, Agent, or Firm* — Holland & Hart LLP

(57) ABSTRACT

Methods, systems, and devices for wireless communications are described. A first communication device may transmit a reference signal and an offset to a second communication device. The offset may be between a first beam associated with the reference signal and a second beam associated with a data signal. The second communication device may perform measurements on the reference signal and use such measurements, in conjunction with the offset, to determine a beam for the first communication device to transmit communications. The second communication device may transmit an interference message corresponding to the second beam. The first communication device may transmit communications via the second beam.

30 Claims, 13 Drawing Sheets

TECHNIQUES FOR INDICATING A SYNCHRONIZATION SIGNAL BLOCK

FIELD OF TECHNOLOGY

The following relates to wireless communications, including techniques for indicating a synchronization signal block (SSB).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some communication devices (e.g., base stations or UEs) may support full-duplex communications, such that the communication devices may transmit downlink communications and receive uplink communications simultaneously. In some examples, neighboring communication devices may perform full-duplex communications concurrently. In such examples, downlink communications transmitted by a first communication device may interfere with uplink communications received by a second (e.g., neighboring) communication device.

SUMMARY

The described techniques relate to improved methods, systems, devices, and apparatuses that support techniques for indicating a synchronization signal block (SSB). Generally, communication devices may exchange information to improve interference mitigation techniques. For example, a first communication device may transmit a reference signal and an offset to a second communication device. In some examples, the offset may be between a first beam associated with the reference signal and a second beam associated with a data signal. The second communication device may perform measurements on the reference signal and use such measurements, in conjunction with the offset, to determine a beam for the first communication device to transmit communications (e.g., to other communication devices). The second communication device may transmit an interference message corresponding to the second beam. In response, the first communication device may transmit communications, such as the data signal, via the second beam. The present disclosure may therefore promote higher reliability and lower latency wireless communications, among other benefits.

DETAILED DESCRIPTION

Figure 1:
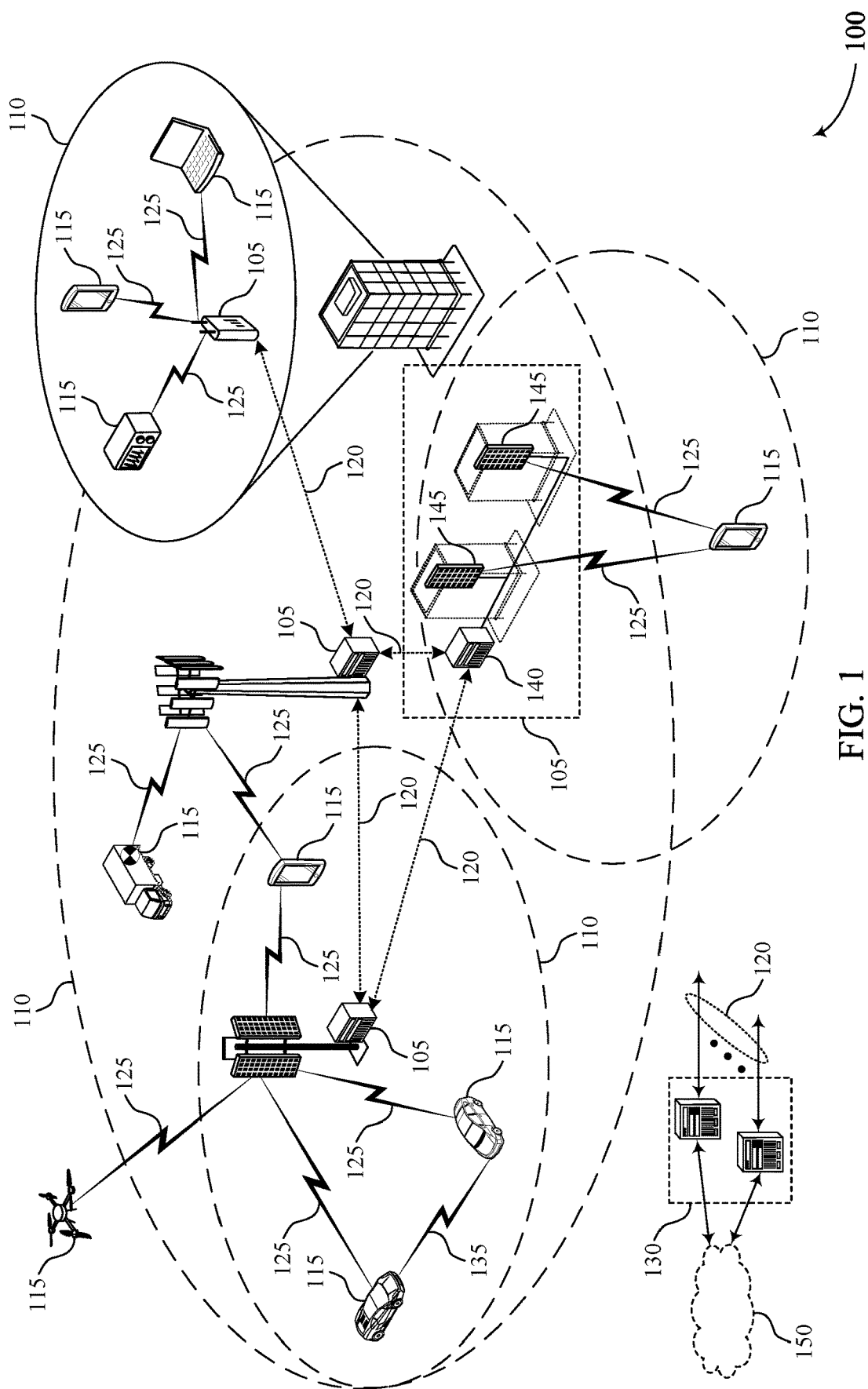
FIGS. 1, 2A, 2B, 2C, and 2D illustrate an example of a wireless communications system that supports techniques for indicating a synchronization signal block (SSB) in accordance with aspects of the present disclosure.

Various aspects of the present disclosure relate to techniques for indicating a synchronization signal block (SSB). A wireless communications system may include a communication device, such as a user equipment (UE) or a base station (e.g., an eNodeB (eNB), a next-generation NodeB or a giga-NodeB, either of which may be referred to as a gNB, or some other base station), that support wireless communications over one or multiple radio access technologies. Examples of radio access technologies may include fourth generation (4G) systems, such as Long Term Evolution (LTE) systems, and fifth generation (5G) systems, which may be referred to as NR systems. The communication device may operate in a half-duplex mode or a full-duplex mode, or a combination thereof. For example, in a half-duplex mode, a UE may either transmit uplink communications or receive downlink communications during a transmission time interval (TTI). A TTI may span one or more time resources (e.g., symbols, mini-slots, slot, etc.). In a full-duplex mode, the communication device may transmit and receive communications simultaneously. For example, downlink communications (e.g., signals) transmitted by the communication device and uplink communications (e.g., signals) received by the communication device may overlap in the time domain (e.g., symbols occupied by the uplink signals and symbols occupied by the downlink signals may overlap).

In some examples, communication devices that support full-duplex communications may experience self-interference caused by signal leakage between transmit and receive antenna arrays (e.g., panels). For example, a communication device (e.g., a base station) simultaneously transmitting downlink communications and receiving uplink communications may experience self-interference on the receive antennas from the downlink transmissions. In some other examples, communication devices that support full-duplex may experience cross-link interference. For example, neighboring communication devices may perform full-duplex communications (e.g., or half-duplex time division duplexing (TDD)) concurrently such that downlink communications transmitted by a first communication device and uplink communications received by a second (e.g., neighboring) communication device may overlap. In such an example, the downlink communications transmitted by the first communication device (e.g., an aggressor device) may interfere with the uplink communications received at the second communication device (e.g., the victim device). Therefore, some communication devices may employ interference management techniques to mitigate interference effects.

For example, a communication device may use reference signals transmitted from other (e.g., neighboring) communication devices to measure (e.g., and account for) interference at the communication device. However, beams used to transmit reference signals may be wider (e.g., may be transmitted with less beam gain and cause less interference) than beams used to transmit downlink communications (e.g., that interfere with simultaneous uplink communications). As such, the interference measured by the communication device (e.g., using the reference signals) may not accurately represent the interference caused by the downlink communications. Thus, techniques for mitigating interference between base stations may be deficient.

Some communication devices may exchange information to improve interference mitigation techniques. For example, a communication device (e.g., a base station or a UE) may transmit an offset to another (e.g., neighboring) communication device. The offset may be a beam gain offset or a power offset between a beam used to transmit reference signals (e.g., SSBs) and a beam used to transmit data signals (e.g., downlink communications).

A neighboring communication device may use the offset, in conjunction with measurements performed on the reference signals transmitted by the communication device, to determine a suitable beam (e.g., a beam with a reduced interference level) for the communication device to transmit the downlink communications. The neighboring communication device may report (e.g., transmit an indication of) the suitable beam to the communication device and the communication device may use the indicated beam to transmit the downlink communications. The communication device may transmit an offset per reference signal (e.g., per SSB beam) measured by the neighboring communication device. The offset may be transmitted via over-the-air signaling or via backhaul signaling. In some examples, the offset may include a gap (e.g., difference) between a gain metric (e.g., decibel per isotropic antenna or decibel per dipole antenna) or a power metric (e.g., decibel or watt) associated with the reference signal beam and a gain or power associated with the data signal beam (i.e., the beam used for downlink communications). The offset may include a ratio of the energy per resource element (EPRE) of the reference signal to the EPRE of a downlink communication.

Particular aspects of the subject matter described herein may be implemented to realize one or more of the following potential advantages. The techniques employed by the described communication devices may provide benefits and enhancements to the operation of the communication devices, including latency reduction. For example, the described techniques may support improvements in full-duplex communications such that downlink signals may be received in uplink slots, which may enable latency savings (e.g., reductions). Further, interference management techniques, as described herein, may support higher data rates, spectrum efficiency enhancement (e.g., per cell or per communication device), and efficient resource utilization, thereby improving throughput and reliability. As such, the described techniques may result in improved network operations and network work efficiencies, among other benefits.

Various aspects of the disclosure are initially described in the context of wireless communications systems. Aspects of the disclosure are then described in the context of example process flows. Aspects of the disclosure are further illustrated by and described with reference to apparatus diagrams, system diagrams, and flowcharts that relate to techniques for indicating an SSB.

FIG. 1 illustrates an example of a wireless communications system 100 that supports techniques for indicating an SSB in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support one or more aspects of techniques for indicating an SSB. For example, a first communication device (e.g., a first base station 105 or a UE 115) may transmit a reference signal and an offset to a second communication device (e.g., a second base station 105 or a second UE 115). The offset may be a beam gain gap or a beam power gap between a beam associated with the reference signal and a beam associated with a data signal (e.g., a downlink communication). The second communication device may perform measurements on the reference signal and use such measurements, in conjunction with the offset, to determine a beam for the first communication device to transmit communications (e.g., to other base stations 105 or the other UEs 115). The second communication device may indicate the determined beam to the first communication device via an interference message. In response, the first communication device may transmit communications, such as the data signal, via the indicated beam.

FIGS. 2A, 2B, 2C and 2D each illustrate an example of a wireless communications system 200 that supports techniques for indicating an SSB in accordance with aspects of the present disclosure. In some examples, the wireless communications systems 200 (e.g., a wireless communications system 200-a, a wireless communications system 200-b, a wireless communications system 200-c, and a wireless communications system 200-d) may implement aspects of the wireless communications system 100. For example, the wireless communications systems 200 may each include one or more base stations 205 (e.g., a base station 205-a, a base station 205-b, a base station 205-c, a base station 205-d, a base station 205-e, a base station 205-f, and a base station 205-g) and one or more UEs 215 (e.g., a UE 215-a, a UE 215-b, a UE 215-c, a UE 215-d, a UE 215-e, a UE 215-f, a UE 215-g, a UE 215-h, a UE 215-i, and a UE 215-j), which may be examples of a base station 105 and UE 115, respectively, described with reference to FIG. 1. The wireless communications systems 200 may also include one or more wireless nodes 235 (e.g., a wireless node 235-a and a wireless node 235-b), which may be examples of an integrated access and backhaul (IAB) node, a transmission and reception point (TRP), a UE 215, a base station 205, or a distributed unit of a base station 205.

In the examples of FIGS. 2A, 2B, 2C and 2D, the UE 215 may transmit communications to the base station 205 via a communication link 210 (e.g., a communication link 210-a, a communication link 210-b, a communication link 210-c, a communication link 210-d, and a communication link 210-e), and may receive communications from the base station 205 via a communication link 220 (e.g., a communication link 220-a, a communication link 220-b, a communication link 220-c, a communication link 220-d, a communication link 220-e, a communication link 220-f, a communication link 220-g, a communication link 220-h, and a communication link 220-i). The communication links 210 may be examples of uplinks and the communication links 220 may be examples of downlinks. The wireless communications systems 200 may include features for improved communications between the UEs 215 and the base stations 205, among other benefits. In some examples of the wireless communications systems 200, the actions performed by one or more base stations 205 may be performed by other communication device, such as the UE 215, and a wireless node 235 Additionally or alternatively, the actions performed by one or more UEs 215 may be performed by other communication device, such as the base station 205, or the wireless node 235. Additionally or alternatively, the actions performed by one or more wireless nodes 235 may be performed by other communication device, such as the base station 205, or the UE 215.

Figure 2A:
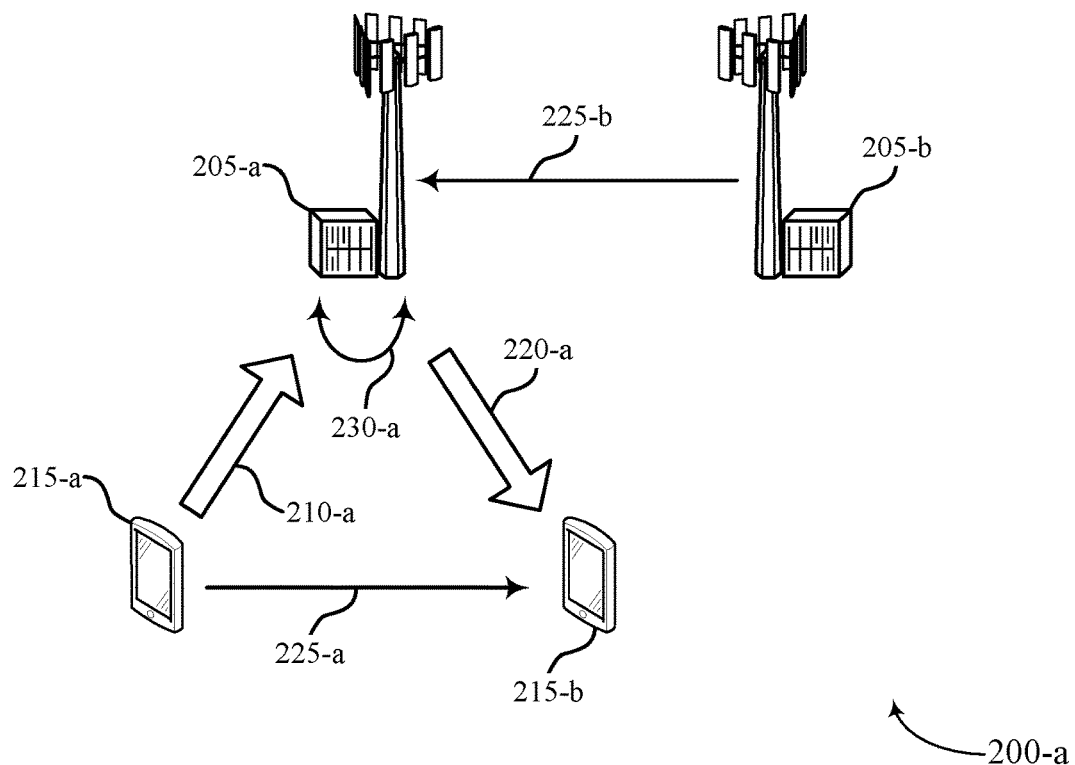

Each wireless communications system 200 may illustrate communication devices (e.g., one or more UEs 215 or one or more base stations 205) operating in a full duplex mode (e.g., performing full-duplex wireless communications). That is, as illustrated in the examples of FIGS. 2A, 2B, 2C, and 2D, full-duplex capability may be present at a base station (e.g., one or more base stations 205), a UE (e.g., one or more base stations 205), or both. For example, as shown in FIG. 2A, the base station 205-a may simultaneously receive uplink transmission (e.g., from a UE 215-a via the communication link 210-a) and transmit downlink transmissions (e.g., to a UE 215-b via the communication link 220-a). That is, at the base station 205-a, uplink reception may be (e.g., occur) at one panel and downlink transmission may occur at another panel. In such an example (e.g., in the example of FIG. 2A), the base station 205-a and the base station 205-b may be operating in a full-duplex mode, while the UE 215-a and the UE 215-b may be operating in a half-duplex mode.

Figure 2B:
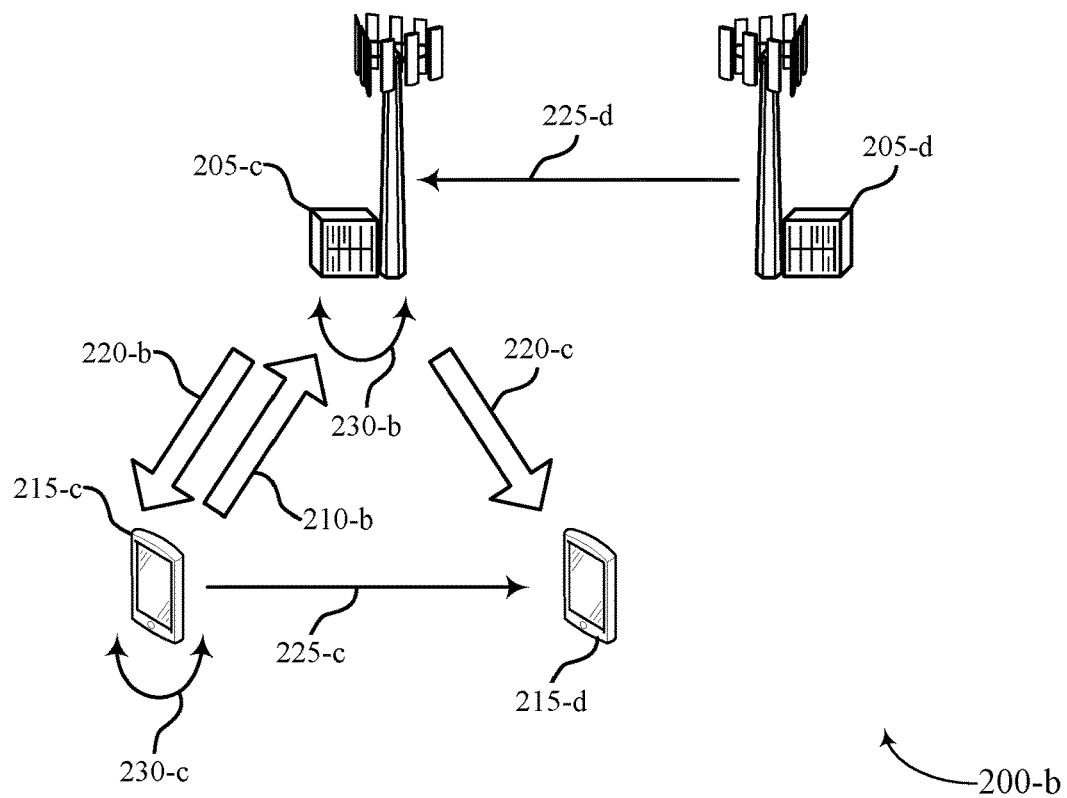
Figure 2C:
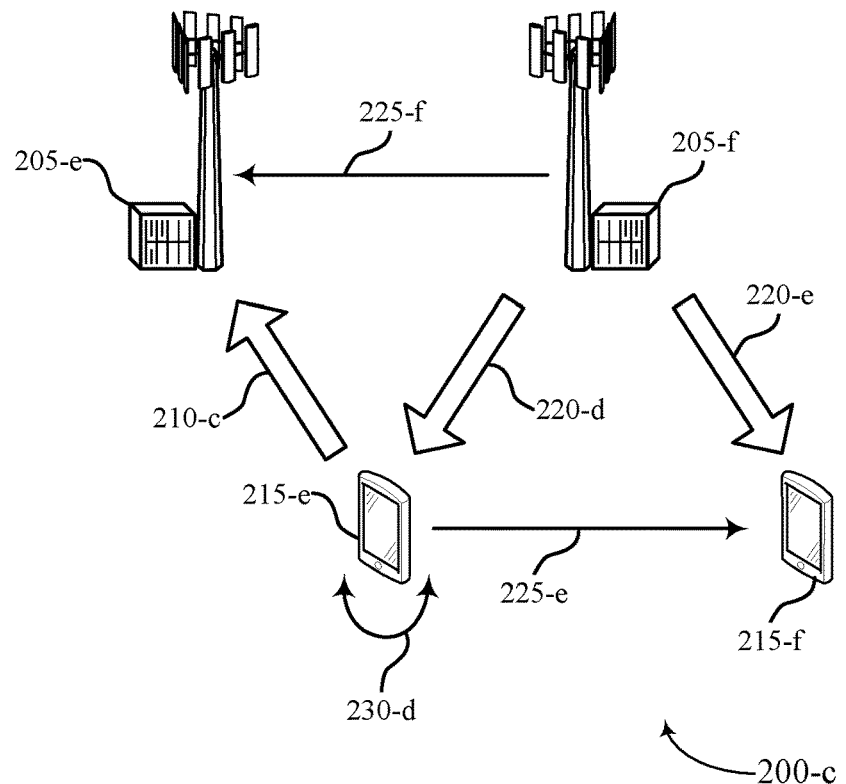
Figure 2D:
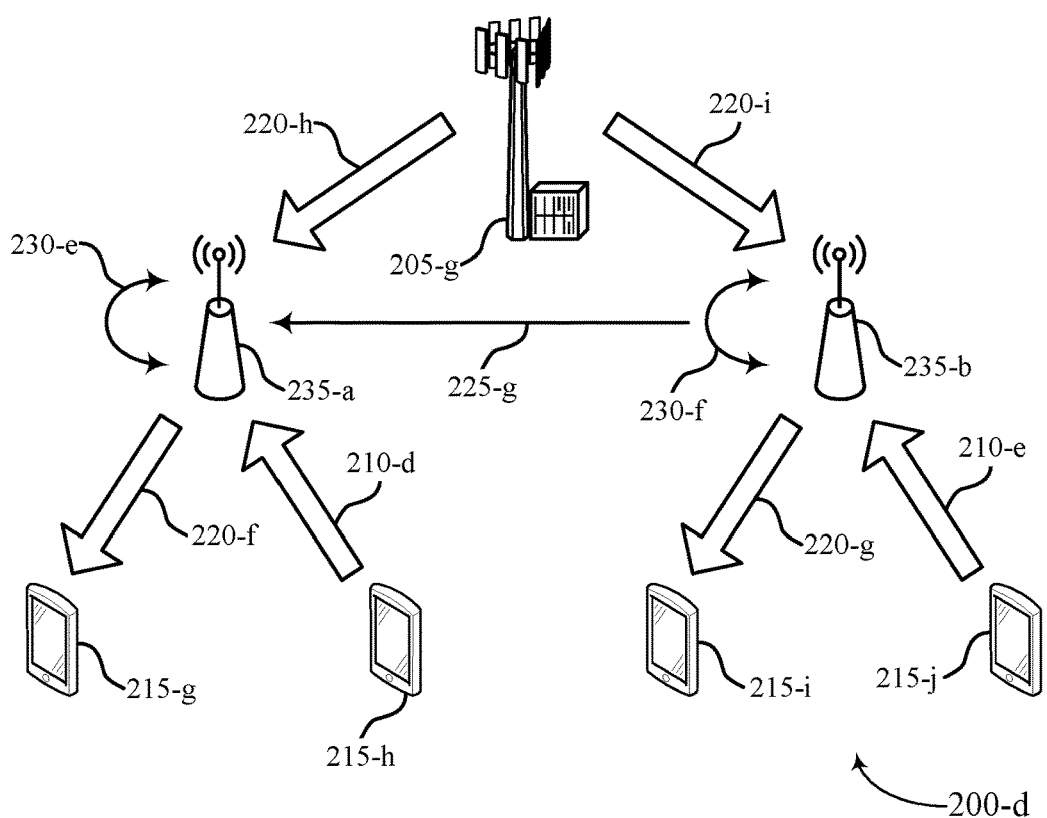

In some examples, the signals transmitted to, and received from, the base station 205-a may occur over a frequency range (e.g., FR1 or FR2). That is simultaneous uplink and downlink transmissions may occur over the FR1 and the FR2 frequency ranges. In some other examples, as shown in the example of FIG. 2B, the UE 215-c may simultaneously receive downlink transmission (e.g., from the base station 205-c via the communication link 210-b) and transmit uplink transmissions (e.g., to the base station 205-c via the communication link 220-b). That is, at the UE 215-c, uplink transmission may be (e.g., occur) from one panel and downlink reception may occur at another panel. In such examples (e.g., in the example of FIG. 2B), the base station 205-c, the base station 205-d, the UE 215-c, and the UE 215-d may each be operating in a full duplex mode. In some examples, such UEs may be referred to as customer provided equipment (CPE). In other examples, downlink reception and uplink transmission may occur at two different antenna panels located at two TRPs (e.g., downlink reception may occur at an antenna panel at a first TRP and uplink transmission may occur at an antenna panel at a second TRP). In some other examples, uplink reception and downlink transmission may occur at two co-located antenna panels at a single base station 205.

Full-duplex communications may provide for latency reduction. For example, latency savings may be enabled by receiving downlink signal in uplink slots. Full-duplex communications may also provide for spectrum efficiency enhancement (e.g., per cell or per UE), efficient resource utilization, and coverage extension, among other benefits. In some examples, full-duplex capabilities may be conditional on beam separation and, as such, may not be continuously enabled (e.g., turned on). For example, a communication device (e.g., the base station 205, the UE 215, or the wireless node 235) may experience self-interference (e.g., self-interference 230-a, self-interference 230-b, self-interference 230-c, self-interference 230-d, self-interference 230-e, and self-interference 230-f) between a pair of beams (e.g., a beam used to transmit downlink signals and a beam used to receive uplink signals) and, as a result, may disable full-duplex communications (e.g., for that beam pair). Self-interference may occur at a first communication device due to full-duplex communications with a single communication device or multiple communication devices.

As a first illustrative example, the base station 205-a may experience self-interference 230-a due to signal leakage between an antenna panel used to transmit downlink signals (e.g., to the UE 215-b) and an antenna panel used to receive uplink signals (e.g., from the UE 215-a). As a second illustrative example, the UE 215-c may experience self-interference 230-b due to signal leakage between antenna panels used for full-duplex communications (e.g., transmitting uplink signals and receiving downlink signals) with the base station 205-c. As a third illustrative example, the UE 215-e may experience self-interference 230-d due to signal leakage between an antenna panel used for transmitting uplink signals to the base station 205-e and receiving downlink signals from the base station 205-f. In such an example (e.g., in the example of FIG. 2C), the base station 205-e and the base station 205-f may be operating in a half-duplex mode (e.g., via multiple TRPs (multi-TRP)), while the UE 215-e may be operating in a full duplex mode (e.g., may be a CPE). As a fourth illustrative example, the wireless node 235-a may experience self-interference from downlink signals transmitted to the UE 215-g and uplink signals received from the UE 215-h. In such an example (e.g., in the example of FIG. 2D), the wireless nodes 235 may be IAB nodes operating in a full-duplex mode. In some examples, the wireless nodes 235 may have enhanced (e.g., conditional) duplexing capability and may support same frequency full-duplex (SFFD), frequency division multiplexing, and space division multiplexing (SDM), for example with red, blue, and green (RBG) granularity.

In another example, a communication device may experience clutter echo, such that reflectors near the communication device cause reflections back to a reception panel and cause interference. In other examples, a communication device may experience cross-link interference (e.g., cross-link interference 225-a, cross-link interference 225-b, cross-link interference 225-c, cross-link interference 225-d, cross-link interference 225-e, cross-link interference 225-f, and cross-link interference 225-g). For example, neighboring base stations (e.g., the base station 205-a and the base station 205-b) may simultaneously perform full-duplex communications such that downlink signals transmitted by the base station 205-a may overlap with uplink signals received by the base station 205-*b* and cause cross-link interference 225-*b*, which may be referred to as inter-base station interference. In another example, neighboring UEs (e.g., the UE 215-*c* and the UE 215-*d*) may simultaneously perform full-duplex communications such that uplink signals transmitted by the UE 215-*c* may overlap with downlink signals received by the UE 215-*d* and cause cross-link interference 225-*c*. In other examples, neighboring wireless nodes (e.g., the wireless node 235-*a* and the wireless node 235-*b*) may simultaneously perform full-duplex communications such that downlink signals transmitted by the wireless node 235-*a* may overlap with uplink signals received by the wireless node 235-*b* and cause cross-link interference 225-*g*.

In some examples, to reduce the effects of interference, a communication device (e.g., the base station 205, the UE 215, or the wireless node 235) may employ one or more interference mitigation techniques. For example, a remote interference management (RIM) framework may be used to mitigate inter-base station interference due to an atmosphere ducting effect where signals may be ducted (e.g., guided) in a direction. In some examples, however, RIM may not improve inter-base station interference in the case of full-duplex communications. For example, RIM procedures may be reduced for remote interference (RI) mitigation. That is, RIM procedures may be deactivated in the absence of the atmospheric ducting effect. Further, RIM procedures may include measurements on each beam used for communications at the communication device. Therefore, RIM procedures may not be effective for full-duplex communications where interference may occur for a beam pair (e.g., a transmission reception beam pair), for example, of multiple beam pairs used for full-duplex communication. Further, reference signals designed for RIM may not be signaled between base stations and, as such, inter-base station measurements may not occur. Thus, interference mitigation techniques, such as RIM, may be deficient.

In some other examples, communication devices may exchange information to improve interference mitigation techniques. For example, a first communication device (e.g., the base station 205, the UE 215, or the wireless node 235) may communicate an offset (e.g., a beam gain or power offset between a reference signal beam and a data signal beam) to a second communication device (e.g., another base station 205, another UE 215, or another wireless node 235). The second communication device may use the offset, in conjunction with measurement performed on reference signals (e.g., SSBs) transmitted from the first communication device, to determine a beam for the first communication device to use for downlink communications (e.g., to one or more other communication devices). The second communication device may then indicate the determined beam to the first communication device and the first communication device may use the indicated beam for downlink communications. In some examples, by indicating an offset between the beam used to transmit the measured reference signals and the beam used to transmit data signals (e.g., the interfering downlink communications), interference in wireless communication between communication devices in the wireless communications systems 200 may be prevented, among other benefits.

Figure 3:
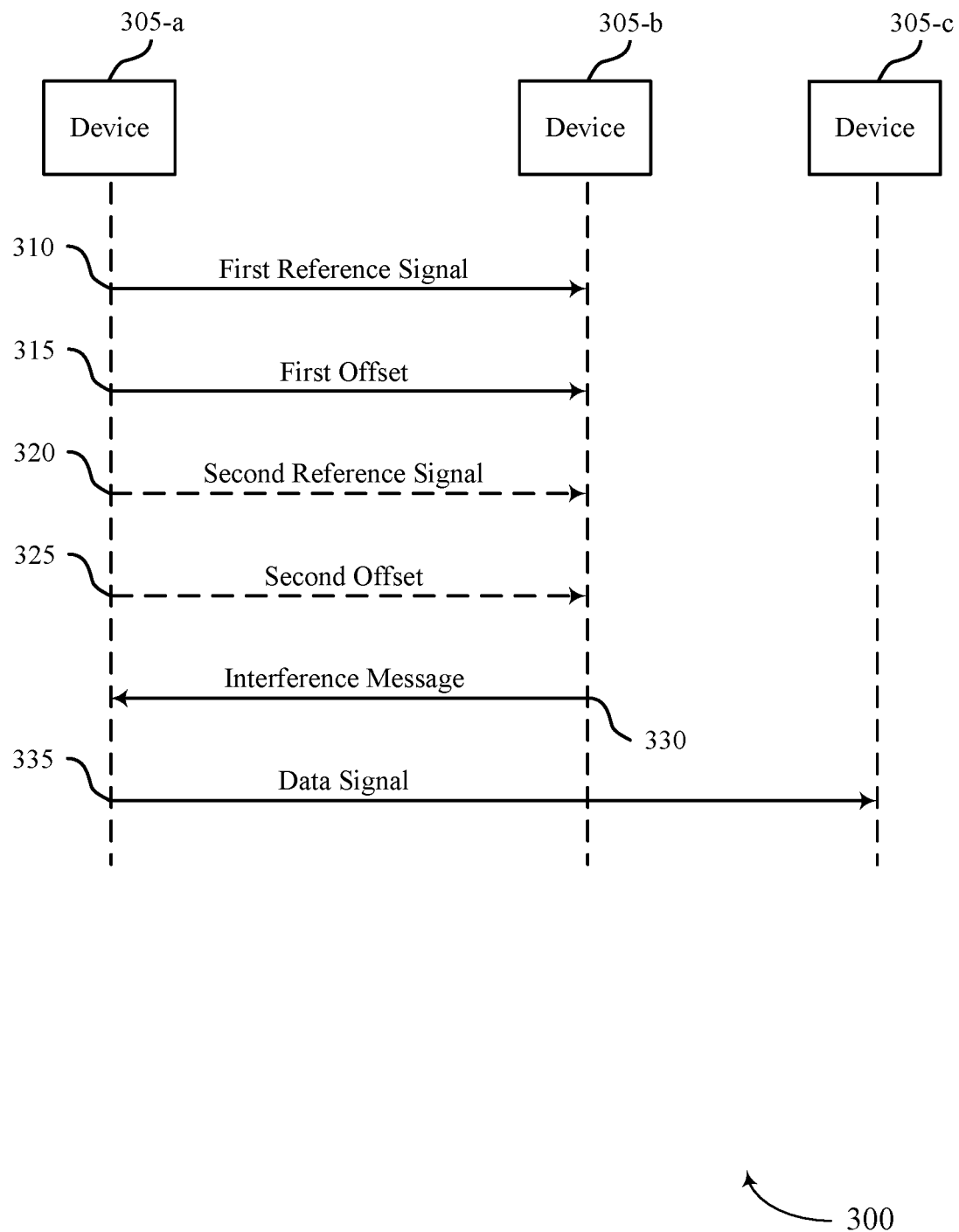
FIGS. 3 and 4 illustrate an example of a process flow that supports techniques for indicating an SSB in accordance with aspects of the present disclosure.

FIG. 3 illustrates an example of a process flow 300 that supports techniques for indicating an SSB in accordance with aspects of the present disclosure. The process flow 300 may implement or be implemented by one or more aspects of the wireless communications system 100 and the wireless communications systems 200. For example, the process flow 300 may include a device 305-*a* and a device 305-*b*, which may be examples of devices as discussed with reference to FIGS. 1, 2A, 2B, 2C, and 2D. In the example of FIG. 3, the device 305-*a* may be a transmitting device (e.g., a base station 105, a UE 115, or a wireless node 235) and the device 305-*b* and the device 305-*c* may be receiving devices (e.g., neighboring base stations 105, neighboring UEs 115, or neighboring wireless nodes 235). In the following description of the process flow 300, operations between the device 305-*a*, the device 305-*b*, and the device 305-*c* may occur in a different order or at different times than as shown. Some operations may also be omitted from the process flow 300, and other operations may be added to the process flow 300.

In some wireless communications systems, communication devices (e.g., a device 305-*a* and a device 305-*b*) may exchange information regarding inter-device (e.g., inter-base station) interference, such as cross-link interference described throughout the present disclosure including with reference to FIGS. 2A, 2B, 2C, and 2D. For example, the device 305-*a* may transmit reference signals to the device 305-*b* for inter-device interference measurements (e.g., enhanced inter-base station interference measurements). That is, the device 305-*a* may transmit reference signals for the device 305-*b* to measure inter-device interference. In some examples, multiple measurement reference signals (e.g., SSBs) may be associated with multiple transmit and receive beam pairs between the device 305-*a* (e.g., the transmitting device) and the device 305-*b* (e.g., the receiving device). As such, the device 305 may update (e.g., periodically) the device 305-*a* with inter-base station beam pair data.

In some examples, the device 305-*b* may indicate received signal strength indicator (RSSI) data to the device 305-*a* based on downlink reference signal beam measurements (e.g., SSB beam measurements) performed by the device 305-*b*. For example, an interference level (e.g., RSSI data) may be measured for different beam pairs and exchanged between the device 305-*a* and the device 305-*b* for inter-device interference (e.g., cross-link interference) mitigation. For example, the interference level may be exchanged among base stations for inter-base station cross-link interference mitigation. In some examples, as illustrated in the following table 1, the interference level may be compared to a threshold to determine one or more suitable beam pairs (e.g., a downlink (DL) beam of the device 305-*a* and an uplink (UL) beam of the device 305-*b*) for full-duplex communications between the device 305-*a* and the device 305-*b*. Such full-duplex communications may be full-duplex communications described throughout the present disclosure including with reference to FIGS. 2A, 2B, 2C, and 2D.

TABLE 1

| | UL beam #1 of device 305-b | UL beam #2 of device 305-b | UL beam #3 of device 305-b |
| --- | --- | --- | --- |
| DL beam #1 of device 305-a | RSSI < Threshold | RSSI < Threshold | RSSI > Threshold |
| DL beam #2 of device 305-a | RSSI < Threshold | RSSI < Threshold | RSSI < Threshold |
| DL beam #3 of device 305-a | RSSI < Threshold | RSSI > Threshold | RSSI < Threshold |

For example, the device 305-*b* may determines that uplink beam #1 and #2 of the device 305-*b* are to be scheduled in a time interval (e.g., in a next or subsequent number (X) of ms). The device 305-*b* may also determine that the interference level measured for the beam pair including the downlink beam #3 of device 305-*a* and the uplink beam #2 of device 305-*b* may be greater than a threshold and, as such may not be a suitable beam pair for full-duplex communications. Thus, the device 305-*b* may then inform (e.g., indicate via over-the-air signaling or backhaul signaling) to the device 305-*a* that downlink beams #1 and #2 of the device 305-*a* may be suitable beams (e.g., the measured RSSI is less than the threshold) for downlink communications transmitted during the time interval (e.g., on the uplink symbols for the device 305-*b* in next or subsequent X ms). In some examples, the device 305-*b* may indicate one or more suitable beams in a report that may have fixed periodic occasions monitored by other (e.g., neighboring) devices 305.

However, beams used by the device 305-*a* to transmit reference signals (e.g., the measured SSB beams) may be wider (e.g., may be transmitted with less beam gain and cause less interference) than beams used to transmit the downlink communications (e.g., data signals) that interfere with uplink communications received at the device 305-*b*. As such, the interference levels measured by the device 305-*b* may not accurately represent the interference caused by downlink communications transmitted from the device 305-*a*. In some examples, rather than exchanging RSSI data (e.g., based on SSB measurements), the device 305-*a* (e.g., the SSB transmitting device) may indicate an offset to the device 305-*b*, such that the device 305-*b* may consider the narrow beam for data transmission (e.g., which may have a different gain than the gain of the SSB beam). That is, the device 305-*b* may use SSB measurements and the indicated offset to consider (e.g., estimate) the interference that may be caused by a beam used for downlink communications. In such examples, the device 305-*b* may estimate the interference experienced from the narrow beam (e.g., used by the device 305-*a* for data transmissions) based on the SSB measurements and the additional offset indication.

For example, at 310 the device 305-*a* may transmit a first reference signal (e.g., a first SSB) to the device 305-*b*. At 315, the device 305-*a* may transmit a first offset between a first beam associated with the first reference signal (e.g., the beam used to transmit the first reference signal) and a second beam associated with a data signal (e.g., a beam to be used for transmitting downlink communications, such as the data signal). In some examples, an offset may be transmitted per SSB or per downlink reference signal for RSSI measurement. For example, the device 305-*a* may transmit a second reference signal at 320 and, accordingly, a second offset at 325. The second offset may be between a third beam used to transmit the second reference signal and the second beam to be used for transmitting the data signal. That is, the first offset may correspond to a beam pair including the first beam and the second beam and the second offset may correspond to a beam pair including the third beam and the fourth beam, where the first beam may be used to transmit a first SSB and the third beam may be used to transmit a second SSB.

In some examples, an offset of the SSB beam (e.g., the first offset or the second offset) may be sent (e.g., to an intended device) via over-the-air signaling (e.g., broadcast, multicast, or unicast). For example, the device 305-*a* may broadcast the offset (e.g., may indicate the offset via a broadcast message) to other devices 305 that may be operating within the network (e.g., including the device 305-*b* and the device 305-*c*). In another example, the device 305-*a* may multicast the offset (e.g., may indicate the offset via a multicast message) to multiple (e.g., a number that may be greater than 1) devices 305 that may be operating within the network (e.g., including the device 305-*b*). In other examples, the device may unicast the offset (e.g., may indicate the offset via a unicast message) to a single device (e.g., the device 305-*b*). In some other examples, an offset may be sent (e.g., transmitted) via backhaul signaling. In other examples, an offset may be transmitted per SSB or per downlink reference signal for RSSI measurement. For example, as discussed above, the first offset may correspond to a beam pair including the first beam and the second beam and the second offset may correspond to a beam pair including the third beam and the fourth beam.

In some examples, an offset (e.g., the first offset and the second offset) may include a beam gain gap, a beam power gap, an EPRE, or an effective isotropic radiated power (EIRP) between a beam used to transmit a reference signal (e.g., an SSB beam) and a beam used to transmit data signals (e.g., a narrower beam relative to the SSB beam). The narrower beam used for data transmission may cause higher interference (e.g., at the device 305-*b*) compared to the wider beam for SSB transmission (e.g., the SSB transmission used for inter-device interference measurements). Therefore, an offset (e.g., the first offset and the second offset) may aid the device 305-*b* to decide the interference that may be experienced at the device 305-*b* during downlink data transmissions by the device 305-*a*.

In some examples, the data signal beam may be quasi co-located with the reference signal beam. For example, the first offset may include a beam gain gap between a gain of the first beam (e.g., the beam used to transmit the first SSB) and a gain of the second beam (e.g., a beam used to transmit the data signal). In some instances, the gain of the beam may refer to the gain used to transmit the beam (e.g., antenna gain). In another example, the offset may include a beam power gap between a power of the first beam (e.g., the beam used to transmit the first SSB) and a power of the second beam (e.g., a beam used to transmit the data signal). In some examples, the power of the beam may refer to the power used to transmit the beam (e.g., the transmit power).

In some examples, the offset may be represented by the ratio of measurement reference signal EPRE to a downlink signal EPRE. The downlink signal may include a physical downlink shared channel (PDSCH) signal or a physical downlink control channel (PDCCH) signal. That is, the EPRE ratio may correspond to the ratio of an EPRE associated with a reference signal (e.g., an SSB) to an EPRE associated with a downlink signal (e.g., a data signal or another reference signal such as a demodulation reference signal (DMRS)). In some examples, the EPRE ratio may be predefined (e.g., preconfigured or configured). In some other examples, the EPRE ratio may be signaled from a transmitting device (e.g., the device 305-*a*) to a receiving device (e.g., the device 305-*b*) for interference estimation. For example, the offset may include an EPRE ratio associated with a resource element occupied by the first SSB and a resource element occupied by a second signal (e.g., a data signal). In another example, the offset may include an EIRP ratio associated with the first beam (e.g., the beam used to transmit the first SSB) and the second beam (e.g., used to transmit the data signal).

At 330, the device 305-*a* may receive an interference message from the device 305-*b*. In some examples, the interference message may correspond to the second beam, which may be used by the device 305-*a* for communications (e.g., downlink communications, such as the data signal). The interference message may be based on measurements performed by the device 305-*b* on the first reference signal (e.g., the first SSB) and the first offset. In some examples, the interference message may be based on the measurement performed on the first reference signal, the first offset, a measurement performed on the second reference signal, and the second offset. At 335, the device 305-*a* may transmit the data signal (e.g., downlink communications) to the device 305-*a* (e.g., another neighboring device) using the second beam indicated by the interference message.

Figure 4:
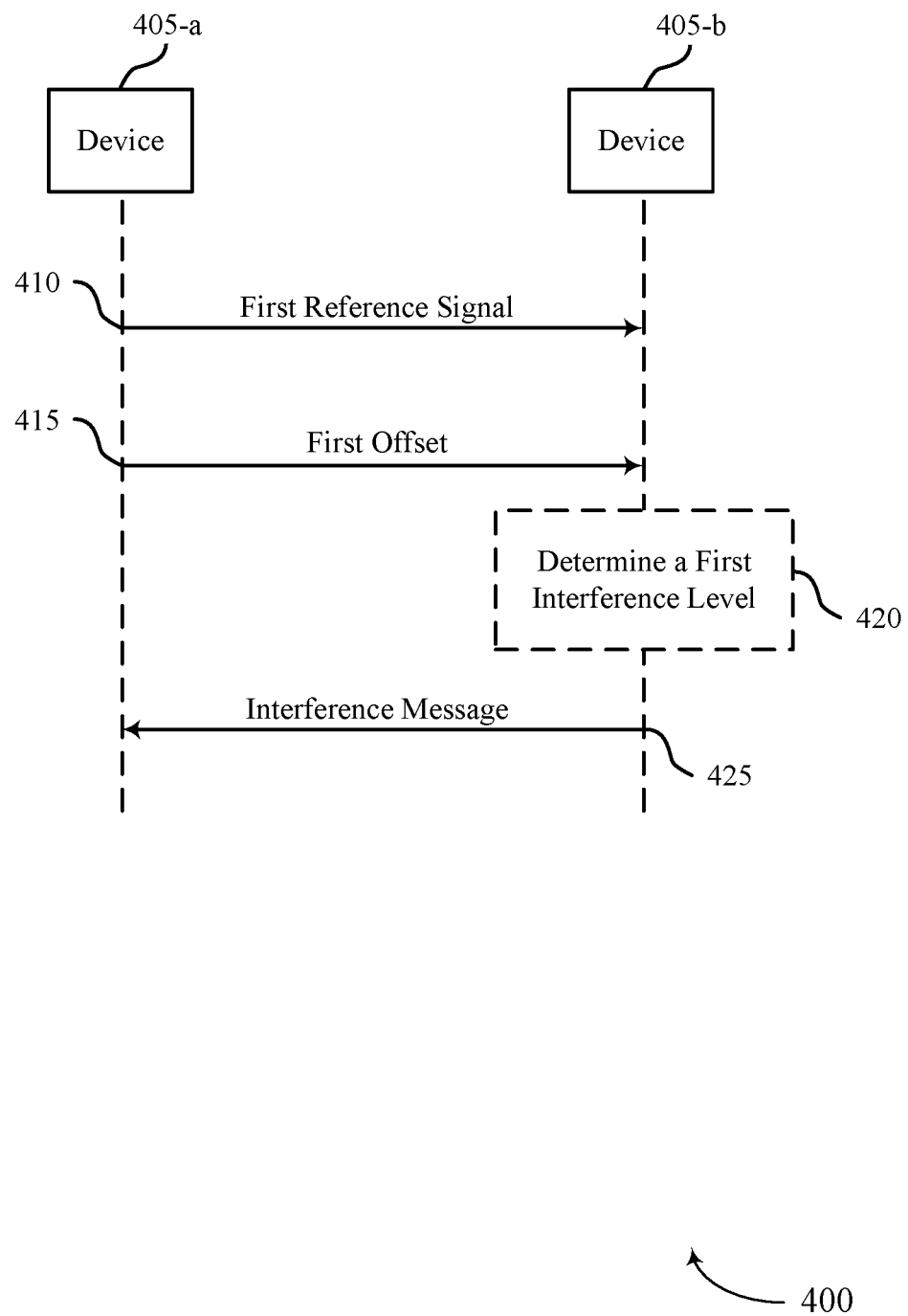

FIG. 4 illustrates an example of a process flow 400 that supports techniques for indicating an SSB in accordance with aspects of the present disclosure. The process flow 400 may implement or be implemented by one or more aspects of the wireless communications system 100 and the wireless communications systems 200. For example, the process flow 400 may include a device 405-*a* and a device 405-*b*, which may be examples of devices as discussed with reference to FIGS. 1, 2A, 2B, 2C, and 2D. In the example of FIG. 4, the device 405-*a* may be a transmitting device (e.g., a base station 105, a UE 115, or a wireless node 235) and the device 405-*b* may be a receiving device (e.g., a neighboring base station 105, a neighboring UE 115, or a neighboring wireless node 235). In the following description of the process flow 400, operations between the device 405-*a* and the device 405-*b* may occur in a different order or at different times than as shown. Some operations may also be omitted from the process flow 400, and other operations may be added to the process flow 400.

At, 410, the device 405-*b* may receive a first reference signal from the device 405-*a*. The reference signal may be an SSB described throughout the present disclosure including with reference to FIG. 3. At 415, the device 405-*a* may receive, an indication of a first offset from the first device. The offset may be an offset described throughout the present disclosure including with reference to FIG. 3. For example, the offset may be between a first beam associated with the first reference signal and a second beam associated with a data signal. In some examples, at 420, the device 405-*b* may determine a first interference level associated with the second beam. The first interference level may be an interference level described throughout the present disclosure including with reference to FIG. 3. For example, the first interference level may be based on the measurement performed on the first reference signal and the first offset.

At 425, the device 405-*b* may transmit an interference message to the device 405-*a*. The interference message may be an interference message described throughout the present disclosure including with reference to FIG. 3. For example, the interference message may correspond to the second beam for communications. In some examples, the device 405-*b* may transmit the interference message based on the first interference level satisfying a threshold. For example, the interference message may be based on a measurement performed on the first reference signal (e.g., an RSSI determined from measuring the first reference signal) and the first offset (e.g., satisfying a threshold). In some examples, the threshold may be predefined (e.g., preconfigured or configured) or, in some other examples, may be communicated (e.g., coordinated) between the device 405-*a* and the device 405-*b*.

Figure 5:
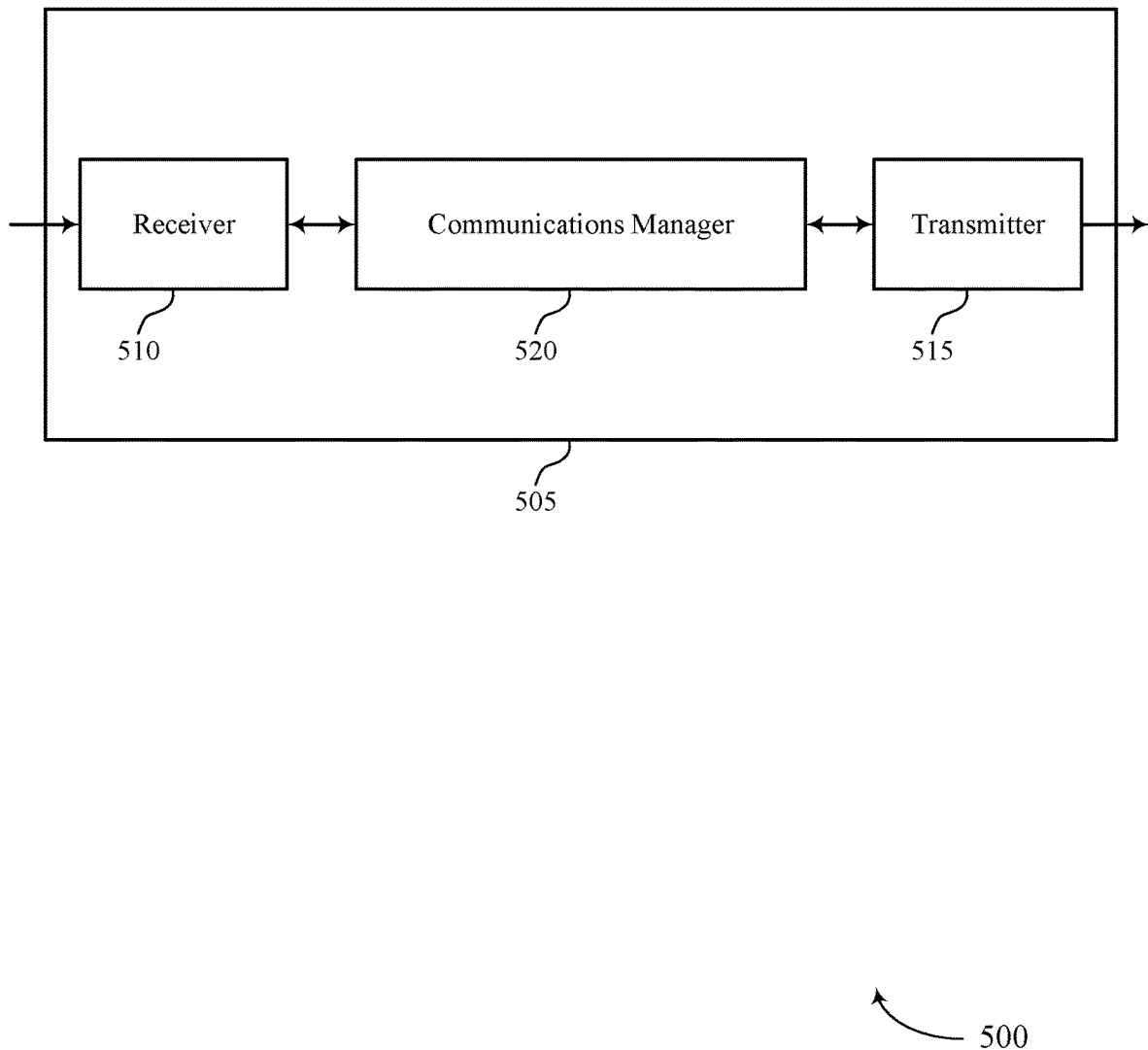
FIGS. 5 and 6 show block diagrams of devices that support techniques for indicating an SSB in accordance with aspects of the present disclosure.

FIG. 5 shows a block diagram 500 of a device 505 that supports techniques for indicating an SSB in accordance with aspects of the present disclosure. The device 505 may be an example of aspects of a base station 105, a UE 115, or a wireless node 235 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for indicating an SSB). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for indicating an SSB). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for indicating an SSB as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first device (e.g., the device 505) in accordance with examples as disclosed herein. For example, the communications manager 520 may be configured as or otherwise support a means for transmitting, to a second device (e.g., another device 505), a first reference signal. The communications manager 520 may be configured as or otherwise support a means for transmitting, to the second device, a first offset between a first beam associated with the first reference signal and a second beam associated with a data signal. The communications manager 520 may be configured as or otherwise support a means for receiving, from the second device, an interference message corresponding to the second beam for communications, the interference message based on a measurement performed on the first reference signal and the first offset. The communications manager 520 may be configured as or otherwise support a means for transmitting the data signal via the second beam indicated by the interference message.

Additionally or alternatively, the communications manager 520 may support wireless communication at a second device (e.g., the other device 505) in accordance with examples as disclosed herein. For example, the communications manager 520 may be configured as or otherwise support a means for receiving, from a first device (e.g., the device 505), a first reference signal. The communications manager 520 may be configured as or otherwise support a means for receiving, from the first device, an indication of a first offset between a first beam associated with the first reference signal and a second beam associated with a data signal. The communications manager 520 may be configured as or otherwise support a means for transmitting, to the first device, an interference message correspond to the second beam for communications, the interference message based on a measurement performed on the first reference signal and the first offset.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for indicating an SSB. For example, the device 505 may transmit (e.g., to another device 505) an offset between a beam associated with a reference signal and a beam associated with a data signal, which may result in reduced latency, improved communication throughput or reliability, more efficient utilization of communication resources, or any combination thereof, among other examples of advantages.

Figure 6:
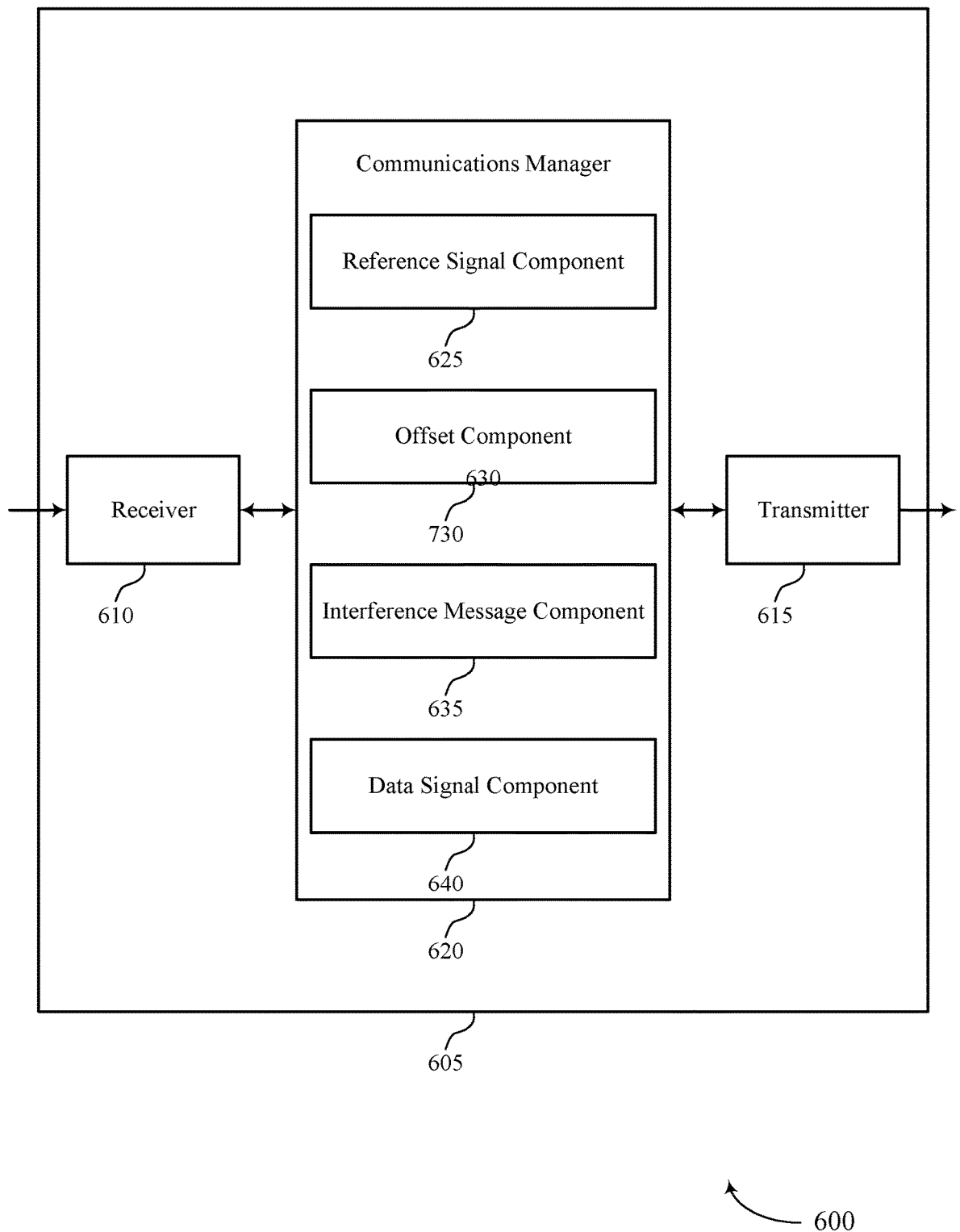

FIG. 6 shows a block diagram 600 of a device 605 that supports techniques for indicating an SSB in accordance with aspects of the present disclosure. The device 605 may be an example of aspects of a device 505, a base station 105, a UE 115, or a wireless node 235 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for indicating an SSB). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for indicating an SSB). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for indicating an SSB as described herein. For example, the communications manager 620 may include a reference signal component 625, an offset component 630, an interference message component 635, a data signal component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device (e.g., the device 605) in accordance with examples as disclosed herein. The reference signal component 625 may be configured as or otherwise support a means for transmitting, to a second device (e.g., another device 605), a first reference signal. The offset component 630 may be configured as or otherwise support a means for transmitting, to the second device, a first offset between a first beam associated with the first reference signal and a second beam associated with a data signal. The interference message component 635 may be configured as or otherwise support a means for receiving, from the second device, an interference message corresponding to the second beam for communications, the interference message based on a measurement performed on the first reference signal and the first offset. The data signal component 640 may be configured as or otherwise support a means for transmitting the data signal via the second beam indicated by the interference message.

Additionally or alternatively, the communications manager 620 may support wireless communication at a second device (e.g., the other device 605) in accordance with examples as disclosed herein. The reference signal component 625 may be configured as or otherwise support a means for receiving, from a first device (e.g., the device 605), a first reference signal. The offset component 630 may be configured as or otherwise support a means for receiving, from the first device, an indication of a first offset between a first beam associated with the first reference signal and a second beam associated with a data signal. The interference message component 635 may be configured as or otherwise support a means for transmitting, to the first device, an interference message correspond to the second beam for communications, the interference message based on a measurement performed on the first reference signal and the first offset.

Figure 7:
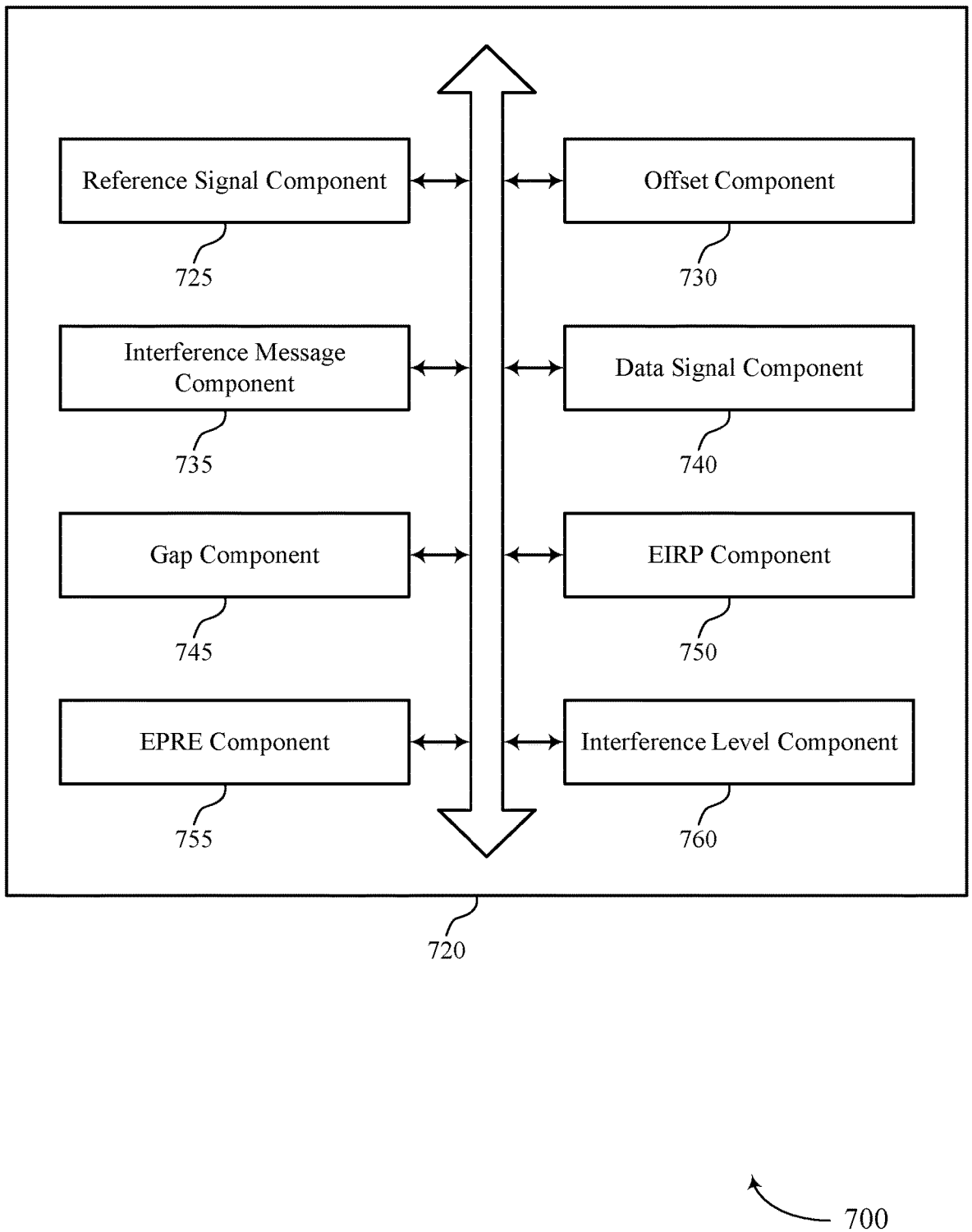
FIG. 7 shows a block diagram of a communications manager that supports techniques for indicating an SSB in accordance with aspects of the present disclosure.

FIG. 7 shows a block diagram 700 of a communications manager 720 that supports techniques for indicating an SSB in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for indicating an SSB as described herein. For example, the communications manager 720 may include a reference signal component 725, an offset component 730, an interference message component 735, a data signal component 740, a gap component 745, an EIRP component 750, a EPRE component 755, an interference level component 760, or any combination thereof. Each of these components may communicate, directly or indirectly, with one another (e.g., via one or more buses).

The communications manager 720 may support wireless communication at a first device (e.g., a base station 105, a UE 115, or a wireless node 235) in accordance with examples as disclosed herein. The reference signal component 725 may be configured as or otherwise support a means for transmitting, to a second device (e.g., another base station 105, another UE 115, or another wireless node 235), a first reference signal. The offset component 730 may be configured as or otherwise support a means for transmitting, to the second device, a first offset between a first beam associated with the first reference signal and a second beam associated with a data signal. The interference message component 735 may be configured as or otherwise support a means for receiving, from the second device, an interference message corresponding to the second beam for communications, the interference message based on a measurement performed on the first reference signal and the first offset. The data signal component 740 may be configured as or otherwise support a means for transmitting the data signal via the second beam indicated by the interference message.

In some examples, the reference signal component 725 may be configured as or otherwise support a means for transmitting, to the second device, a second reference signal. In some examples, the offset component 730 may be configured as or otherwise support a means for transmitting, to the second device, a second offset between a third beam associated with the second reference signal and a fourth beam associated with a second data signal, where the interference message corresponding to the second beam for the communications is based on the measurement performed on the first reference signal, the first offset, a measurement performed on the second reference signal, and the second offset.

In some examples, to support transmitting, to the second device, the first offset between the first beam associated with the first reference signal and the second beam associated with the data signal, the offset component 730 may be configured as or otherwise support a means for transmitting, an over-the-air transmission to the second device, the over-the-air transmission including the first offset between the first beam associated with the first reference signal and the second beam associated with the data signal. In some examples, the over-the-air transmission further includes a broadcast message, a multicast message, or a unicast message. In some examples, to support transmitting, to the second device, the first offset between the first beam associated with the first reference signal and the second beam associated with the data signal, the offset component 730 may be configured as or otherwise support a means for transmitting, via backhaul signaling, the first offset between the first beam associated with the first reference signal and the second beam associated with the data signal.

In some examples, the gap component 745 may be configured as or otherwise support a means for determining a beam gain gap between a first gain associated with the first beam and a second gain associated with the second beam, the first gain and the second gain each based on a respective gain metric. In some examples, the gap component 745 may be configured as or otherwise support a means for transmitting, to the second device, the beam gain gap, where the beam gain gap includes the first offset.

In some examples, the gap component 745 may be configured as or otherwise support a means for determining a beam power gap between a first power associated with the first beam and a second power associated with the second beam, the first power and the second power each based on a respective power metric. In some examples, the gap component 745 may be configured as or otherwise support a means for transmitting, to the second device, the beam power gap, where the beam power gap includes the first offset.

In some examples, the EIRP component 750 may be configured as or otherwise support a means for determining an EIRP ratio associated with the first beam and the second beam. In some examples, the EIRP component 750 may be configured as or otherwise support a means for transmitting, to the second device, the EIRP ratio, where the EIRP ratio includes the first offset.

In some examples, the EPRE component 755 may be configured as or otherwise support a means for determining an EPRE ratio associated with a resource element occupied by the first reference signal and a resource element occupied by a second signal. In some examples, the EPRE component 755 may be configured as or otherwise support a means for transmitting, to the second device, the EPRE ratio, where the EPRE ratio includes the first offset. In some examples, the EPRE ratio is predefined. In some examples, the second signal includes the data signal or a DMRS. In some examples, the first reference signal includes an SSB. In some examples, the first beam is quasi co-located with the second beam. In some examples, the second device is a base station or a UE.

Additionally or alternatively, the communications manager 720 may support wireless communication at a second device (e.g., the other base station 105, the other UE 115, or the other wireless node 235) in accordance with examples as disclosed herein. In some examples, the reference signal component 725 may be configured as or otherwise support a means for receiving, from a first device (e.g., the base station 105, the UE 115, or the wireless node 235), a first reference signal. In some examples, the offset component 730 may be configured as or otherwise support a means for receiving, from the first device, an indication of a first offset between a first beam associated with the first reference signal and a second beam associated with a data signal. In some examples, the interference message component 735 may be configured as or otherwise support a means for transmitting, to the first device, an interference message correspond to the second beam for communications, the interference message based on a measurement performed on the first reference signal and the first offset.

In some examples, the interference level component 760 may be configured as or otherwise support a means for determining a first interference level associated with the second beam, the first interference level based on the measurement performed on the first reference signal and the first offset, where transmitting, to the first device, the interference message corresponding to the second beam for the communications is based on the first interference level satisfying a threshold.

In some examples, the reference signal component 725 may be configured as or otherwise support a means for receiving, from the first device, a second reference signal. In some examples, the offset component 730 may be configured as or otherwise support a means for receiving, from the first device, a second offset between a third beam associated with the second reference signal and a fourth beam associated with a second data signal. In some examples, the interference level component 760 may be configured as or otherwise support a means for determining a second interference level associated with the third beam, the second interference level based on a measurement performed on the second reference signal and the second offset, where transmitting, to the first device, the interference message corresponding to the second beam for the communications is based on the second interference level failing to satisfy the threshold.

In some examples, the measurement performed on the first reference signal includes an RSSI. In some examples, to support receiving, from the first device, the first offset between the first beam associated with the first reference signal and the second beam associated with the data signal, the offset component 730 may be configured as or otherwise support a means for receiving, an over-the-air transmission from the first device, the over-the-air transmission including the first offset between the first beam associated with the first reference signal and the second beam associated with the data signal. In some examples, the over-the-air transmission further includes a broadcast message, a multicast message, or a unicast message.

In some examples, to support receiving, from the first device, the first offset between the first beam associated with the first reference signal and the second beam associated with the data signal, the offset component 730 may be configured as or otherwise support a means for receiving, via backhaul signaling, the first offset between the first beam associated with the first reference signal and the second beam associated with the data signal.

In some examples, the first offset includes a beam gain gap between a first gain associated with the first beam and a second gain associated with the second beam, the first gain and the second gain each based on a respective gain metric. In some examples, the first offset includes a beam power gap between a first power associated with the first beam and a second power associated with the second beam, the first power and the second power each based on a respective gain metric. In some examples, the EIRP component 750 may be configured as or otherwise support a means for receiving, from the first device, an effective isotropic radiated power (EIRP) ratio associated with the first beam and the second beam, where the EIRP ratio includes the first offset.

In some examples, the EPRE component 755 may be configured as or otherwise support a means for receiving, from the first device, an energy per resource element (EPRE) ratio associated with a resource element occupied by the first reference signal and a resource element occupied by a second signal, where the EPRE ratio includes the first offset.

In some examples, the EPRE ratio is predefined. In some examples, the second signal includes the data signal or a demodulation reference signal. In some examples, the first reference signal includes an SSB. In some examples, the first beam is quasi co-located with the second beam. In some examples, the second device is a base station or a UE.

Figure 8:
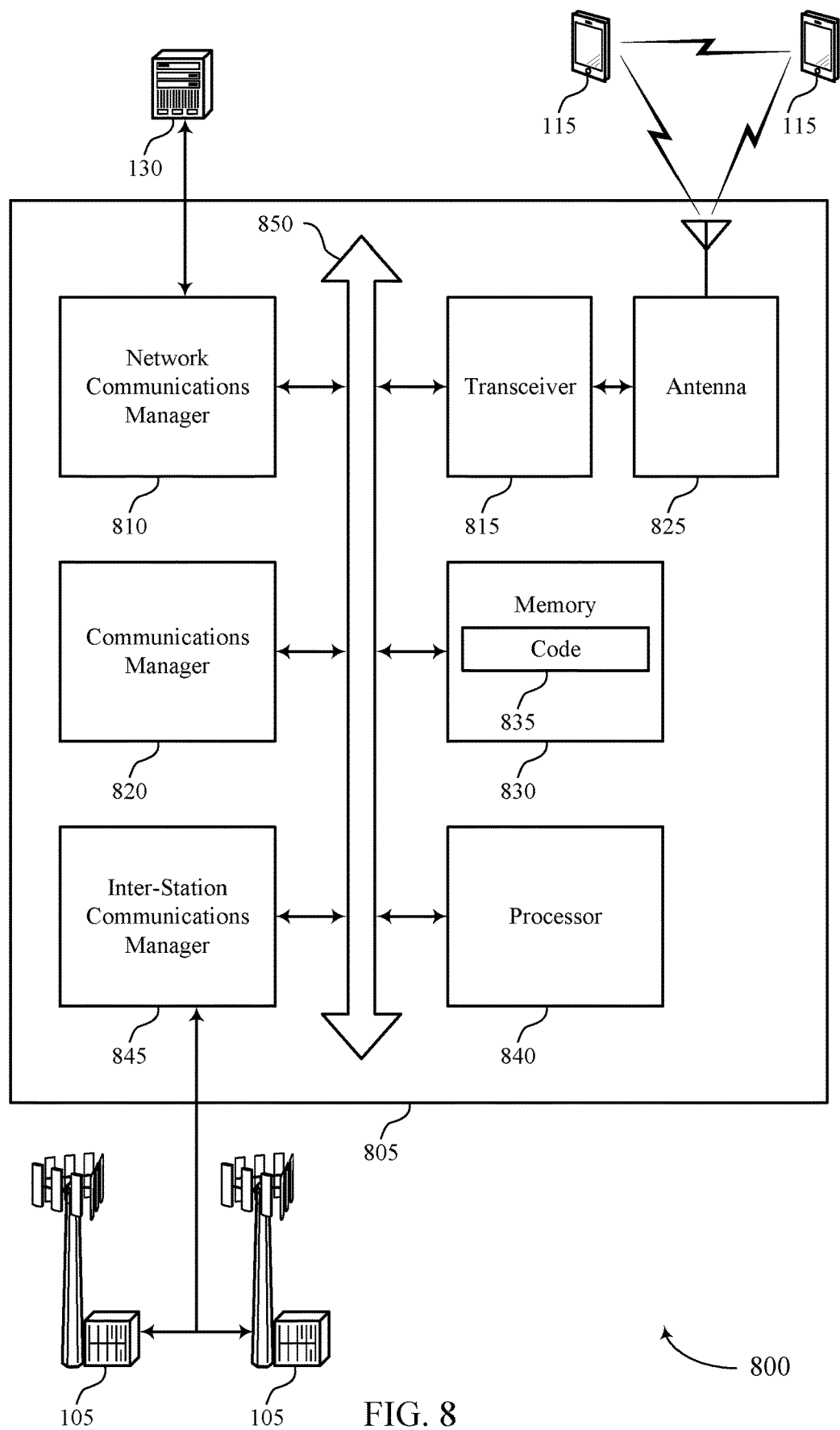
FIG. 8 shows a diagram of a system including a device that supports techniques for indicating an SSB in accordance with aspects of the present disclosure.

FIG. 8 shows a diagram of a system 800 including a device 805 that supports techniques for indicating an SSB in accordance with aspects of the present disclosure. The device 805 may be an example of or include the components of a device 505, a device 605, a base station 105, a UE 115, or a wireless node 235 as described herein. The device 805 may communicate wirelessly with one or more base stations 105, UEs 115, wireless nodes 235, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for indicating an SSB). For example, the device 805 or a component of the device 805 may include a processor 840 and memory 830 coupled with the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a first device (e.g., the device 805) in accordance with examples as disclosed herein. For example, the communications manager 820 may be configured as or otherwise support a means for transmitting, to a second device (e.g., another device 805), a first reference signal. The communications manager 820 may be configured as or otherwise support a means for transmitting, to the second device, a first offset between a first beam associated with the first reference signal and a second beam associated with a data signal. The communications manager 820 may be configured as or otherwise support a means for receiving, from the second device, an interference message corresponding to the second beam for communications, the interference message based on a measurement performed on the first reference signal and the first offset. The communications manager 820 may be configured as or otherwise support a means for transmitting the data signal via the second beam indicated by the interference message.

Additionally or alternatively, the communications manager 820 may support wireless communication at a second device (e.g., the other device 805) in accordance with examples as disclosed herein. For example, the communications manager 820 may be configured as or otherwise support a means for receiving, from a first device (e.g., the device 805), a first reference signal. The communications manager 820 may be configured as or otherwise support a means for receiving, from the first device, an indication of a first offset between a first beam associated with the first reference signal and a second beam associated with a data signal. The communications manager 820 may be configured as or otherwise support a means for transmitting, to the first device, an interference message correspond to the second beam for communications, the interference message based on a measurement performed on the first reference signal and the first offset.

By including or configuring the communications manager 820 in accordance with examples as described herein, the device 805 may support techniques for indicating an SSB. For example, the device 805 may transmit (e.g., to another device 805) an offset between a beam associated with a reference signal and a beam associated with a data signal, which may result in reduced latency, improved communication throughput or reliability, more efficient utilization of communication resources, or any combination thereof, among other examples of advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for indicating an SSB as described herein, or the processor 840 and the memory 830 may be otherwise configured to perform or support such operations.

Figure 9:
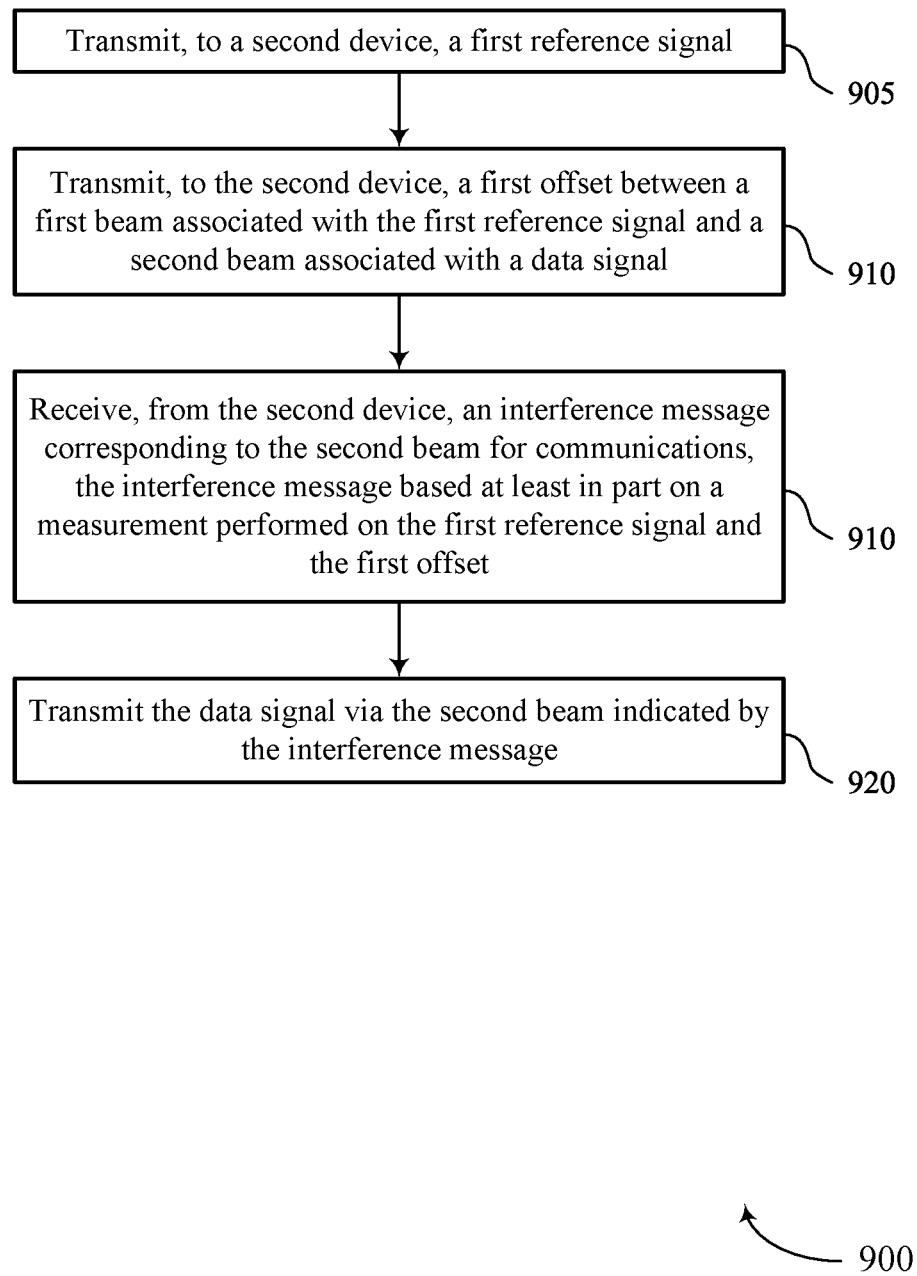
FIGS. 9 through 12 show flowcharts illustrating methods that support techniques for indicating an SSB in accordance with aspects of the present disclosure.

FIG. 9 shows a flowchart illustrating a method 900 that supports techniques for indicating an SSB in accordance with aspects of the present disclosure. The operations of the method 900 may be implemented by a device or its components as described herein. For example, the operations of the method 900 may be performed by a base station 105, a UE 115, or a wireless node 235 as described with reference to FIGS. 1 through 8. In some examples, a device may execute a set of instructions to control the functional elements of the device to perform the described functions. Additionally or alternatively, the base station may perform aspects of the described functions using special-purpose hardware.

At 905, the method may include transmitting, to a second device, a first reference signal. The operations of 905 may be performed in accordance with examples as disclosed herein. In some examples, aspects of the operations of 905 may be performed by a reference signal component 725 as described with reference to FIG. 7.

At 910, the method may include transmitting, to the second device, a first offset between a first beam associated with the first reference signal and a second beam associated with a data signal. The operations of 910 may be performed in accordance with examples as disclosed herein. In some examples, aspects of the operations of 910 may be performed by an offset component 730 as described with reference to FIG. 7.

At 915, the method may include receiving, from the second device, an interference message corresponding to the second beam for communications, the interference message based on a measurement performed on the first reference signal and the first offset. The operations of 915 may be performed in accordance with examples as disclosed herein. In some examples, aspects of the operations of 915 may be performed by an interference message component 735 as described with reference to FIG. 7.

At 920, the method may include transmitting the data signal via the second beam indicated by the interference message. The operations of 920 may be performed in accordance with examples as disclosed herein. In some examples, aspects of the operations of 920 may be performed by a data signal component 740 as described with reference to FIG. 7.

Figure 10:
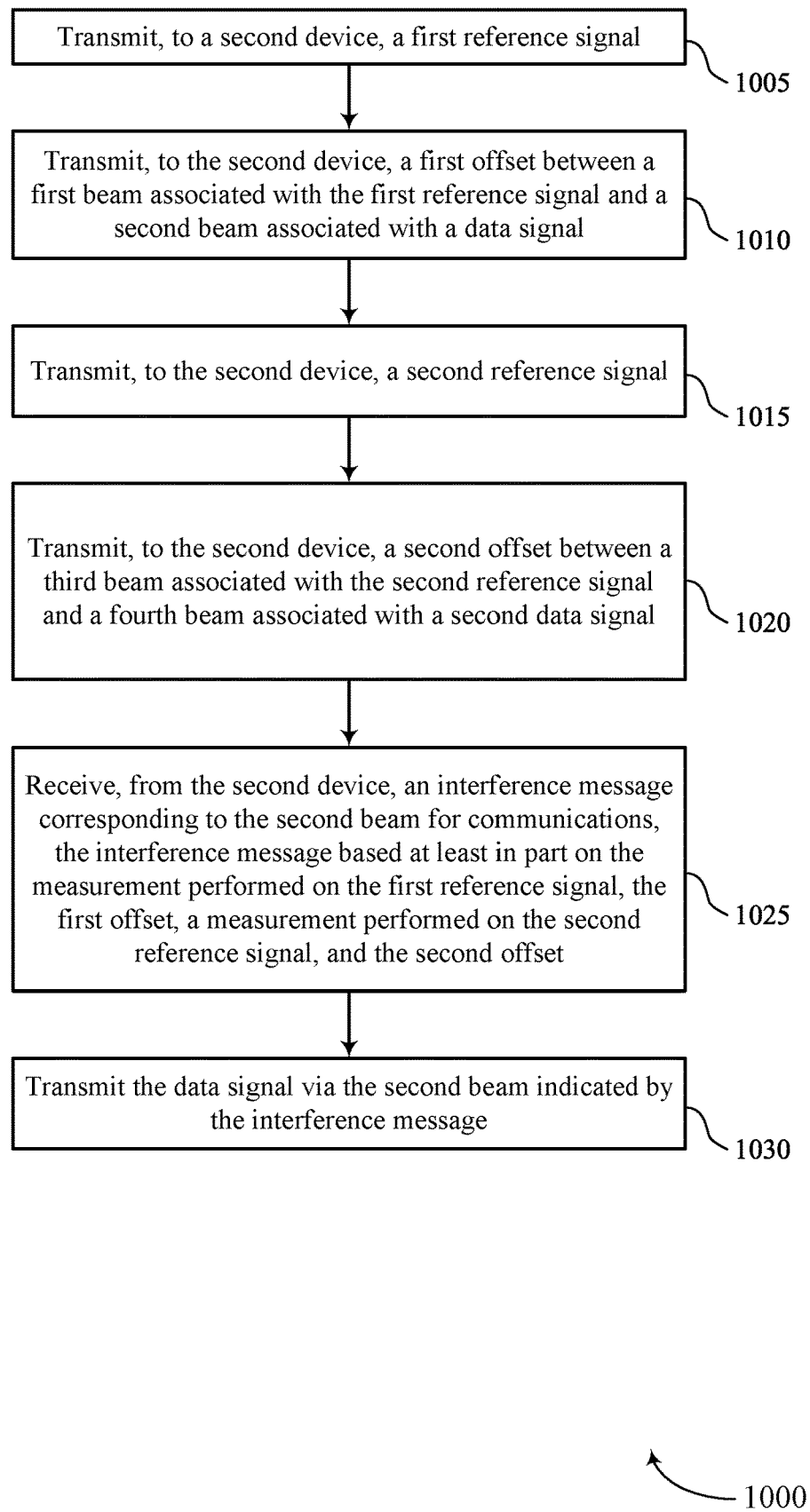

FIG. 10 shows a flowchart illustrating a method 1000 that supports techniques for indicating an SSB in accordance with aspects of the present disclosure. The operations of the method 1000 may be implemented by a device or its components as described herein. For example, the operations of the method 1000 may be performed by a base station 105, a UE 115, or a wireless node 235 as described with reference to FIGS. 1 through 8. In some examples, a device may execute a set of instructions to control the functional elements of the device to perform the described functions.

Additionally or alternatively, the device may perform aspects of the described functions using special-purpose hardware.

At 1005, the method may include transmitting, to a second device, a first reference signal. The operations of 1005 may be performed in accordance with examples as disclosed herein. In some examples, aspects of the operations of 1005 may be performed by a reference signal component 725 as described with reference to FIG. 7.

At 1010, the method may include transmitting, to the second device, a first offset between a first beam associated with the first reference signal and a second beam associated with a data signal. The operations of 1010 may be performed in accordance with examples as disclosed herein. In some examples, aspects of the operations of 1010 may be performed by an offset component 730 as described with reference to FIG. 7.

At 1015, the method may include transmitting, to the second device, a second reference signal. The operations of 1015 may be performed in accordance with examples as disclosed herein. In some examples, aspects of the operations of 1015 may be performed by a reference signal component 725 as described with reference to FIG. 7.

At 1020, the method may include transmitting, to the second device, a second offset between a third beam associated with the second reference signal and a fourth beam associated with a second data signal. The operations of 1020 may be performed in accordance with examples as disclosed herein. In some examples, aspects of the operations of 1020 may be performed by an offset component 730 as described with reference to FIG. 7.

At 1025, the method may include receiving, from the second device, an interference message corresponding to the second beam for communications, the interference message based on the measurement performed on the first reference signal, the first offset, a measurement performed on the second reference signal, and the second offset. The operations of 1025 may be performed in accordance with examples as disclosed herein. In some examples, aspects of the operations of 1025 may be performed by an interference message component 735 as described with reference to FIG. 7.

At 1030, the method may include transmitting the data signal via the second beam indicated by the interference message. The operations of 1030 may be performed in accordance with examples as disclosed herein. In some examples, aspects of the operations of 1030 may be performed by a data signal component 740 as described with reference to FIG. 7.

Figure 11:
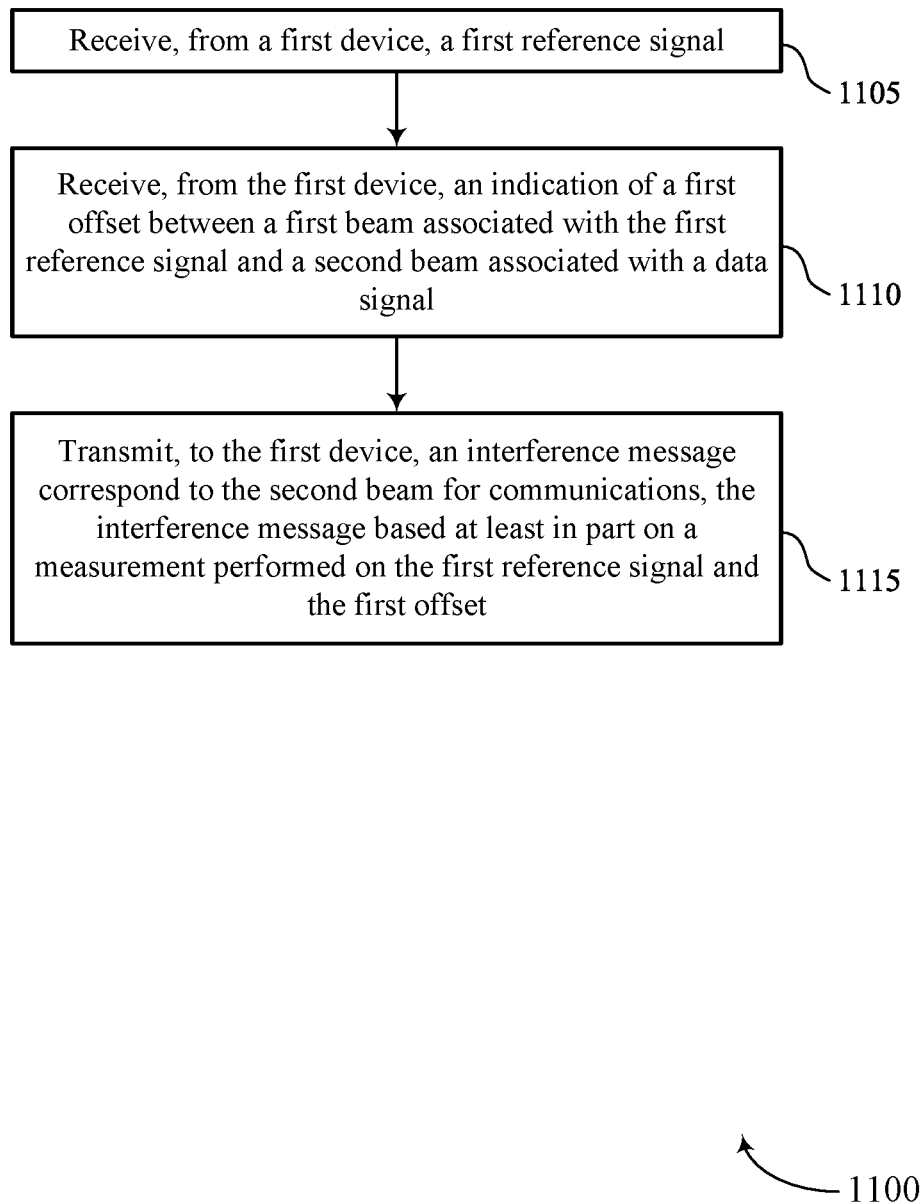

FIG. 11 shows a flowchart illustrating a method 1100 that supports techniques for indicating an SSB in accordance with aspects of the present disclosure. The operations of the method 1100 may be implemented by a device or its components as described herein. For example, the operations of the method 1100 may be performed by a base station 105, a UE 115, or a wireless node 235 as described with reference to FIGS. 1 through 8. In some examples, a device may execute a set of instructions to control the functional elements of the device to perform the described functions. Additionally or alternatively, the device may perform aspects of the described functions using special-purpose hardware.

At 1105, the method may include receiving, from a first device, a first reference signal. The operations of 1105 may be performed in accordance with examples as disclosed herein. In some examples, aspects of the operations of 1105 may be performed by a reference signal component 725 as described with reference to FIG. 7.

At 1110, the method may include receiving, from the first device, an indication of a first offset between a first beam associated with the first reference signal and a second beam associated with a data signal. The operations of 1110 may be performed in accordance with examples as disclosed herein. In some examples, aspects of the operations of 1110 may be performed by an offset component 730 as described with reference to FIG. 7.

At 1115, the method may include transmitting, to the first device, an interference message correspond to the second beam for communications, the interference message based on a measurement performed on the first reference signal and the first offset. The operations of 1115 may be performed in accordance with examples as disclosed herein. In some examples, aspects of the operations of 1115 may be performed by an interference message component 735 as described with reference to FIG. 7.

Figure 12:
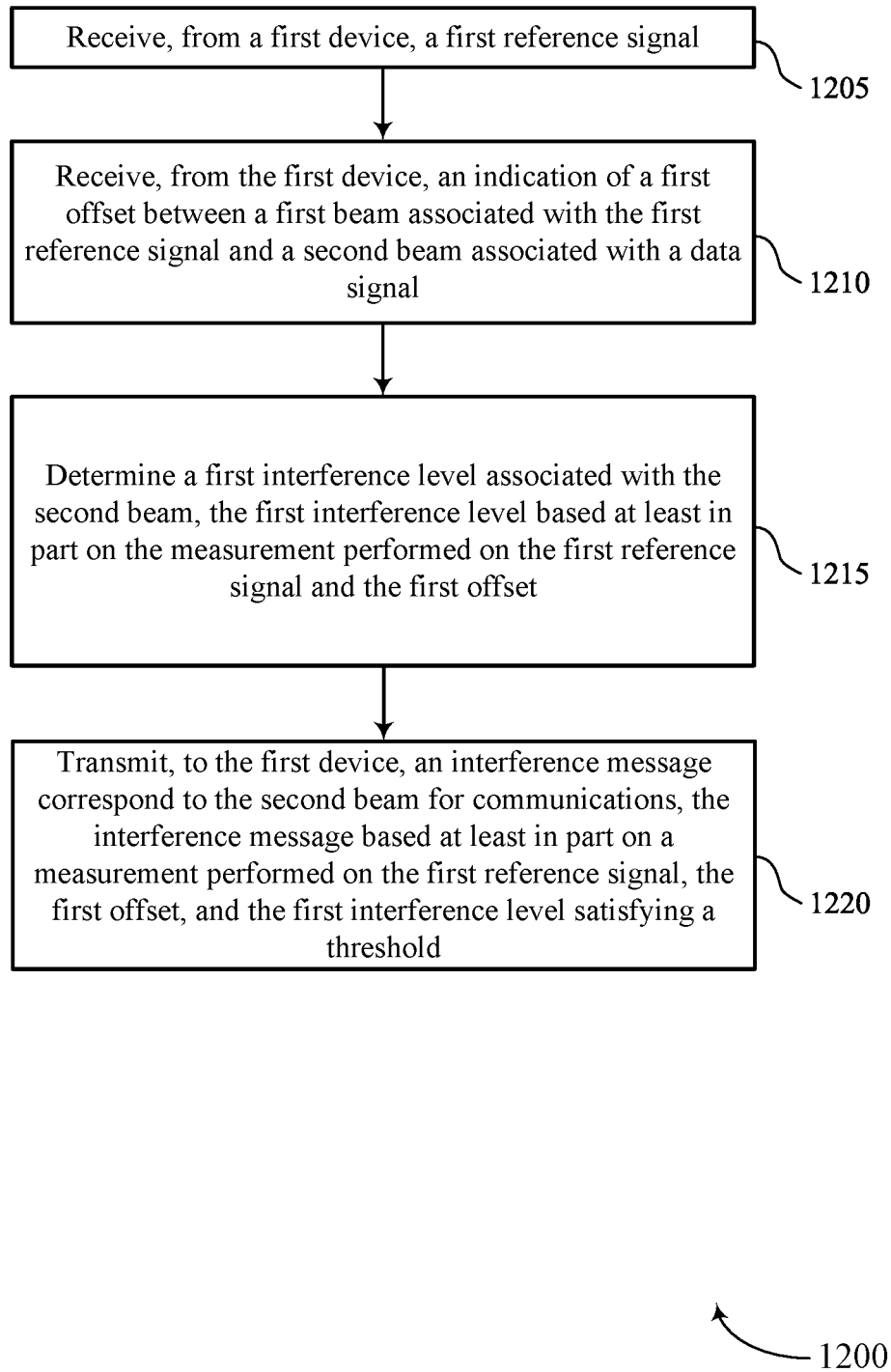

FIG. 12 shows a flowchart illustrating a method 1200 that supports techniques for indicating an SSB in accordance with aspects of the present disclosure. The operations of the method 1200 may be implemented by a device or its components as described herein. For example, the operations of the method 1200 may be performed by a base station 105, a UE 115, or a wireless node 235 as described with reference to FIGS. 1 through 8. In some examples, a device may execute a set of instructions to control the functional elements of the device to perform the described functions. Additionally or alternatively, the device may perform aspects of the described functions using special-purpose hardware.

At 1205, the method may include receiving, from a first device, a first reference signal. The operations of 1205 may be performed in accordance with examples as disclosed herein. In some examples, aspects of the operations of 1205 may be performed by a reference signal component 725 as described with reference to FIG. 7.

At 1210, the method may include receiving, from the first device, an indication of a first offset between a first beam associated with the first reference signal and a second beam associated with a data signal. The operations of 1210 may be performed in accordance with examples as disclosed herein. In some examples, aspects of the operations of 1210 may be performed by an offset component 730 as described with reference to FIG. 7.

At 1215, the method may include determining a first interference level associated with the second beam, the first interference level based on the measurement performed on the first reference signal and the first offset. The operations of 1215 may be performed in accordance with examples as disclosed herein. In some examples, aspects of the operations of 1215 may be performed by an interference level component 760 as described with reference to FIG. 7.

At 1220, the method may include transmitting, to the first device, an interference message correspond to the second beam for communications, the interference message based on a measurement performed on the first reference signal, the first offset and the first interference level satisfying a threshold. The operations of 1220 may be performed in accordance with examples as disclosed herein. In some examples, aspects of the operations of 1220 may be performed by an interference message component 735 as described with reference to FIG. 7.

The following provides an overview of aspects of the present disclosure:

Aspect 1: A method for wireless communication at a first device, comprising: transmitting, to a second device, a first reference signal; transmitting, to the second device, a first offset between a first beam associated with the first reference signal and a second beam associated with a data signal; receiving, from the second device, an interference message corresponding to the second beam for communications, the interference message based at least in part on a measurement performed on the first reference signal and the first offset; and transmitting the data signal via the second beam indicated by the interference message.

Aspect 2: The method of aspect 1, further comprising: transmitting, to the second device, a second reference signal; and transmitting, to the second device, a second offset between a third beam associated with the second reference signal and a fourth beam associated with a second data signal, wherein the interference message corresponding to the second beam for the communications is based at least in part on the measurement performed on the first reference signal, the first offset, a measurement performed on the second reference signal, and the second offset.

Aspect 3: The method of any of aspects 1 through 2, wherein transmitting, to the second device, the first offset between the first beam associated with the first reference signal and the second beam associated with the data signal comprises: transmitting, an over-the-air transmission to the second device, the over-the-air transmission comprising the first offset between the first beam associated with the first reference signal and the second beam associated with the data signal.

Aspect 4: The method of aspect 3, wherein the over-the-air transmission further comprises a broadcast message, a multicast message, or a unicast message.

Aspect 5: The method of any of aspects 1 through 2, wherein transmitting, to the second device, the first offset between the first beam associated with the first reference signal and the second beam associated with the data signal comprises: transmitting, via backhaul signaling, the first offset between the first beam associated with the first reference signal and the second beam associated with the data signal.

Aspect 6: The method of any of aspects 1 through 5, further comprising: determining a beam gain gap between a first gain associated with the first beam and a second gain associated with the second beam, the first gain and the second gain each based at least in part on a respective gain metric; and transmitting, to the second device, the beam gain gap, wherein the beam gain gap comprises the first offset.

Aspect 7: The method of any of aspects 1 through 5, further comprising: determining a beam power gap between a first power associated with the first beam and a second power associated with the second beam, the first power and the second power each based at least in part on a respective power metric; and transmitting, to the second device, the beam power gap, wherein the beam power gap comprises the first offset.

Aspect 8: The method of any of aspects 1 through 5, further comprising: determining an EIRP ratio associated with the first beam and the second beam; and transmitting, to the second device, the EIRP ratio, wherein the EIRP ratio comprises the first offset.

Aspect 9: The method of any of aspects 1 through 5, further comprising: determining an EPRE ratio associated with a resource element occupied by the first reference signal and a resource element occupied by a second signal; and transmitting, to the second device, the EPRE ratio, wherein the EPRE ratio comprises the first offset.

Aspect 10: The method of aspect 9, wherein the EPRE ratio is predefined.

Aspect 11: The method of any of aspects 9 through 10, wherein the second signal comprises the data signal or a DMRS.

Aspect 12: The method of any of aspects 1 through 11, wherein the first reference signal comprises an SSB.

Aspect 13: The method of any of aspects 1 through 12, wherein the first beam is quasi co-located with the second beam.

Aspect 14: The method of any of aspects 1 through 13, wherein the second device is a base station or a UE.

Aspect 15: A method for wireless communication at a second device, comprising: receiving, from a first device, a first reference signal; receiving, from the first device, an indication of a first offset between a first beam associated with the first reference signal and a second beam associated with a data signal; and transmitting, to the first device, an interference message correspond to the second beam for communications, the interference message based at least in part on a measurement performed on the first reference signal and the first offset.

Aspect 16: The method of aspect 15, further comprising: determining a first interference level associated with the second beam, the first interference level based at least in part on the measurement performed on the first reference signal and the first offset, wherein transmitting, to the first device, the interference message corresponding to the second beam for the communications is based at least in part on the first interference level satisfying a threshold.

Aspect 17: The method of aspect 16, further comprising: receiving, from the first device, a second reference signal; receiving, from the first device, a second offset between a third beam associated with the second reference signal and a fourth beam associated with a second data signal; and determining a second interference level associated with the third beam, the second interference level based at least in part on a measurement performed on the second reference signal and the second offset, wherein transmitting, to the first device, the interference message corresponding to the second beam for the communications is based at least in part on the second interference level failing to satisfy the threshold.

Aspect 18: The method of any of aspects 16 through 17, wherein the measurement performed on the first reference signal comprises an RSSI.

Aspect 19: The method of any of aspects 15 through 18, wherein receiving, from the first device, the first offset between the first beam associated with the first reference signal and the second beam associated with the data signal comprises: receiving, an over-the-air transmission from the first device, the over-the-air transmission comprising the first offset between the first beam associated with the first reference signal and the second beam associated with the data signal.

Aspect 20: The method of aspect 19, wherein the over-the-air transmission further comprises a broadcast message, a multicast message, or a unicast message.

Aspect 21: The method of any of aspects 15 through 18, wherein receiving, from the first device, the first offset between the first beam associated with the first reference signal and the second beam associated with the data signal comprises: receiving, via backhaul signaling, the first offset between the first beam associated with the first reference signal and the second beam associated with the data signal.

Aspect 22: The method of any of aspects 15 through 21, wherein the first offset comprises a beam gain gap between a first gain associated with the first beam and a second gain associated with the second beam, the first gain and the second gain each based at least in part on a respective gain metric.

Aspect 23: The method of any of aspects 15 through 21, wherein the first offset comprises a beam power gap between a first power associated with the first beam and a second power associated with the second beam, the first power and the second power each based at least in part on a respective power metric.

Aspect 24: The method of any of aspects 15 through 21, further comprising: receiving, from the first device, an EIRP ratio associated with the first beam and the second beam, wherein the EIRP ratio comprises the first offset.

Aspect 25: The method of any of aspects 15 through 21, further comprising: receiving, from the first device, an EPRE ratio associated with a resource element occupied by the first reference signal and a resource element occupied by a second signal, wherein the EPRE ratio comprises the first offset.

Aspect 26: The method of aspect 25, wherein the EPRE ratio is predefined.

Aspect 27: The method of any of aspects 25 through 26, wherein the second signal comprises the data signal or a DMRS.

Aspect 28: The method of any of aspects 15 through 27, wherein the first reference signal comprises an SSB.

Aspect 29: The method of any of aspects 15 through 28, wherein the first beam is quasi co-located with the second beam.

Aspect 30: The method of any of aspects 15 through 29, wherein the second device is a base station or a UE.

Aspect 31: An apparatus for wireless communication at a first device, comprising a processor; memory coupled with the processor; and instructions stored in the memory and executable by the processor to cause the apparatus to perform a method of any of aspects 1 through 14.

Aspect 32: An apparatus for wireless communication at a first device, comprising at least one means for performing a method of any of aspects 1 through 14.

Aspect 33: A non-transitory computer-readable medium storing code for wireless communication at a first device, the code comprising instructions executable by a processor to perform a method of any of aspects 1 through 14.

Aspect 34: An apparatus for wireless communication at a second device, comprising a processor; memory coupled with the processor; and instructions stored in the memory and executable by the processor to cause the apparatus to perform a method of any of aspects 15 through 30.

Aspect 35: An apparatus for wireless communication at a second device, comprising at least one means for performing a method of any of aspects 15 through 30.

Aspect 36: A non-transitory computer-readable medium storing code for wireless communication at a second device, the code comprising instructions executable by a processor to perform a method of any of aspects 15 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
   a processor;
   memory coupled with the processor; and
   instructions stored in the memory and executable by the processor to cause the apparatus to:
      transmit, to a second device, a first reference signal;
      transmit, to the second device, a first offset between a first beam associated with the first reference signal and a second beam associated with a data signal;
      receive, from the second device based at least in part on a measurement performed on the first reference signal using the first offset satisfying a measurement threshold, an interference message that requests the first device use the second beam for subsequent communications; and
      transmit the data signal via the second beam indicated by the interference message.

2. The apparatus of claim 1, wherein the instructions are further executable by the processor to cause the apparatus to:
   transmit, to the second device, a second reference signal; and
   transmit, to the second device, a second offset between a third beam associated with the second reference signal and a fourth beam associated with a second data signal, wherein the interference message corresponding to the second beam for the subsequent communications is based at least in part on the measurement performed on the first reference signal, the first offset, a measurement performed on the second reference signal, and the second offset.

3. The apparatus of claim 1, wherein the instructions to transmit, to the second device, the first offset between the first beam associated with the first reference signal and the second beam associated with the data signal are executable by the processor to cause the apparatus to:
   transmit, an over-the-air transmission to the second device, the over-the-air transmission comprising the first offset between the first beam associated with the first reference signal and the second beam associated with the data signal.

4. The apparatus of claim 3, wherein the over-the-air transmission further comprises a broadcast message, a multicast message, or a unicast message.

5. The apparatus of claim 1, wherein the instructions to transmit, to the second device, the first offset between the first beam associated with the first reference signal and the second beam associated with the data signal are executable by the processor to cause the apparatus to:
   transmit, via backhaul signaling, the first offset between the first beam associated with the first reference signal and the second beam associated with the data signal.

6. The apparatus of claim 1, wherein the instructions are further executable by the processor to cause the apparatus to:
   determine a beam gain gap between a first gain associated with the first beam and a second gain associated with the second beam, the first gain and the second gain each based at least in part on a respective gain metric; and
   transmit, to the second device, the beam gain gap, wherein the beam gain gap comprises the first offset.

7. The apparatus of claim 1, wherein the instructions are further executable by the processor to cause the apparatus to:
   determine a beam power gap between a first power associated with the first beam and a second power associated with the second beam, the first power and the second power each based at least in part on a respective power metric; and
   transmit, to the second device, the beam power gap, wherein the beam power gap comprises the first offset.

8. The apparatus of claim 1, wherein the instructions are further executable by the processor to cause the apparatus to:

determine an effective isotropic radiated power (EIRP) ratio associated with the first beam and the second beam; and transmit, to the second device, the EIRP ratio, wherein the EIRP ratio comprises the first offset.

9. The apparatus of claim 1, wherein the instructions are further executable by the processor to cause the apparatus to:

determine an energy per resource element (EPRE) ratio associated with a resource element occupied by the first reference signal and a resource element occupied by a second signal; and transmit, to the second device, the EPRE ratio, wherein the EPRE ratio comprises the first offset.

10. The apparatus of claim 9, wherein:

the EPRE ratio is predefined.

11. The apparatus of claim 9, wherein the second signal comprises the data signal or a demodulation reference signal.

12. The apparatus of claim 1, wherein the first reference signal comprises a synchronization signal block.

13. The apparatus of claim 1, wherein the first beam is quasi co-located with the second beam.

14. An apparatus for wireless communication at a second device, comprising:

a processor;

memory coupled with the processor; and instructions stored in the memory and executable by the processor to cause the apparatus to:

receive, from a first device, a first reference signal;

receive, from the first device, an indication of a first offset between a first beam associated with the first reference signal and a second beam associated with a data signal; and transmit, to the first device based at least in part on a measurement performed on the first reference signal using the first offset satisfying a measurement threshold, an interference message that requests the first device use the second beam for subsequent communications.

15. The apparatus of claim 14, wherein the instructions are further executable by the processor to cause the apparatus to:

determine a first interference level associated with the second beam, the first interference level based at least in part on the measurement performed on the first reference signal and the first offset, wherein transmitting, to the first device, the interference message corresponding to the second beam for the subsequent communications is based at least in part on the first interference level satisfying the measurement threshold.

16. The apparatus of claim 15, wherein the instructions are further executable by the processor to cause the apparatus to:

receive, from the first device, a second reference signal;

receive, from the first device, a second offset between a third beam associated with the second reference signal and a fourth beam associated with a second data signal; and determine a second interference level associated with the third beam, the second interference level based at least in part on a measurement performed on the second reference signal and the second offset, wherein transmitting, to the first device, the interference message corresponding to the second beam for the subsequent communications is based at least in part on the second interference level failing to satisfy the measurement threshold.

17. The apparatus of claim 15, wherein the measurement performed on the first reference signal comprises a received signal strength indicator (RSSI).

18. The apparatus of claim 14, wherein the second device is a base station or a user equipment (UE).

19. A method for wireless communication at a first device, comprising:

transmitting, to a second device, a first reference signal;

transmitting, to the second device, a first offset between a first beam associated with the first reference signal and a second beam associated with a data signal;

receiving, from the second device based at least in part on a measurement performed on the first reference signal using the first offset satisfying a measurement threshold, an interference message that requests the first device use the second beam for subsequent communications; and transmitting the data signal via the second beam indicated by the interference message.

20. The method of claim 19, further comprising:

transmitting, to the second device, a second reference signal; and transmitting, to the second device, a second offset between a third beam associated with the second reference signal and a fourth beam associated with a second data signal, wherein the interference message corresponding to the second beam for the subsequent communications is based at least in part on the measurement performed on the first reference signal, the first offset, a measurement performed on the second reference signal, and the second offset.

21. The method of claim 19, wherein transmitting, to the second device, the first offset between the first beam associated with the first reference signal and the second beam associated with the data signal comprises:

transmitting, an over-the-air transmission to the second device, the over-the-air transmission comprising the first offset between the first beam associated with the first reference signal and the second beam associated with the data signal.

22. The method of claim 19, wherein transmitting, to the second device, the first offset between the first beam associated with the first reference signal and the second beam associated with the data signal comprises:

transmitting, via backhaul signaling, the first offset between the first beam associated with the first reference signal and the second beam associated with the data signal.

23. The method of claim 19, further comprising:

determining a beam gain gap between a first gain associated with the first beam and a second gain associated with the second beam, the first gain and the second gain each based at least in part on a respective gain metric; and transmitting, to the second device, the beam gain gap, wherein the beam gain gap comprises the first offset.

24. The method of claim 19, further comprising:

determining a beam power gap between a first power associated with the first beam and a second power associated with the second beam, the first power and the second power each based at least in part on a respective power metric; and transmitting, to the second device, the beam power gap, wherein the beam power gap comprises the first offset.

25. The method of claim 19, further comprising:
determining an energy per resource element (EPRE) ratio associated with a resource element occupied by the first reference signal and a resource element occupied by a second signal; and
transmitting, to the second device, the EPRE ratio, wherein the EPRE ratio comprises the first offset.

26. The method of claim 25, wherein the EPRE ratio is predefined.

27. A method for wireless communication at a second device, comprising:
receiving, from a first device, a first reference signal;
receiving, from the first device, an indication of a first offset between a first beam associated with the first reference signal and a second beam associated with a data signal; and
transmitting, to the first device based at least in part on a measurement performed on the first reference signal using the first offset satisfying a measurement threshold, an interference message that requests the first device use the second beam for subsequent communications.

28. The method of claim 27, further comprising:
determining a first interference level associated with the second beam, the first interference level based at least in part on the measurement performed on the first reference signal and the first offset, wherein transmitting, to the first device, the interference message corresponding to the second beam for the subsequent communications is based at least in part on the first interference level satisfying the measurement threshold.

29. The method of claim 28, further comprising:
receiving, from the first device, a second reference signal;
receiving, from the first device, a second offset between a third beam associated with the second reference signal and a fourth beam associated with a second data signal; and
determining a second interference level associated with the third beam, the second interference level based at least in part on a measurement performed on the second reference signal and the second offset, wherein transmitting, to the first device, the interference message corresponding to the second beam for the subsequent communications is based at least in part on the second interference level failing to satisfy the measurement threshold.

30. The method of claim 27, wherein the second device is a base station or a user equipment (UE).

* * * * *